(12) United States Patent
Sato

(10) Patent No.: US 8,299,551 B2
(45) Date of Patent: Oct. 30, 2012

(54) SEMICONDUCTOR PRESSURE SENSOR AND METHOD FOR MANUFACTURING THE SAME

(75) Inventor: Kimitoshi Sato, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 223 days.

(21) Appl. No.: 12/846,072

(22) Filed: Jul. 29, 2010

(65) Prior Publication Data

US 2011/0140215 A1 Jun. 16, 2011

(30) Foreign Application Priority Data

Dec. 14, 2009 (JP) ................................ 2009-282468

(51) Int. Cl.
*H04R 23/00* (2006.01)
*G01L 9/00* (2006.01)
(52) U.S. Cl. ................. 257/418; 257/419; 257/E29.324
(58) Field of Classification Search .................. 257/417, 257/418, 419, E29.324
See application file for complete search history.

(56) References Cited

U.S. PATENT DOCUMENTS

| | | | | |
|---|---|---|---|---|
| 5,471,086 A | * | 11/1995 | Ipposhi et al. | 257/417 |
| 5,589,810 A | * | 12/1996 | Fung | 338/4 |
| 7,926,354 B2 | * | 4/2011 | Sato | 73/754 |
| 2007/0189558 A1 | * | 8/2007 | Ogura et al. | 381/191 |
| 2010/0242618 A1 | * | 9/2010 | Sato | 73/727 |
| 2011/0266640 A1 | * | 11/2011 | Kasai et al. | 257/416 |

FOREIGN PATENT DOCUMENTS

JP 10-511459 11/1998

OTHER PUBLICATIONS

U.S. Appl. No. 12/542,921, filed Aug. 18, 2009, Kimitoshi Sato.
U.S. Appl. No. 12/542,960, filed Aug. 18, 2009, Kimitoshi Sato.

* cited by examiner

*Primary Examiner* — Ngan Ngo
(74) *Attorney, Agent, or Firm* — Oblon, Spivak, McClelland, Maier & Neustadt, L.L.P.

(57) ABSTRACT

A semiconductor pressure sensor comprises: a substrate having a through-hole; a polysilicon film provided on the substrate and having a diaphragm above the through-hole; an insulating film provided on the polysilicon film; first, second, third, and forth polysilicon gauge resistances provided on the insulating film and having a piezoresistor effect; and polysilicon wirings connecting the first, second, third, and forth polysilicon gauge resistances in a bridge shape, wherein each of the first and second polysilicon gauge resistances is disposed on a central portion of the diaphragm and has a plurality of resistors connected in parallel, a structure of the first polysilicon gauge resistance is same as a structure of the second polysilicon gauge resistance, and a direction of the first polysilicon gauge resistance is same as a direction of the second polysilicon gauge resistance.

9 Claims, 22 Drawing Sheets

SEMICONDUCTOR PRESSURE SENSOR AND METHOD FOR MANUFACTURING THE SAME

BACKGROUND OF THE INVENTION

1. Field of the Invention

The present invention relates to a semiconductor pressure sensor and method for manufacturing the same wherein a plurality of polysilicon gauge resistances having a piezoresistor effect are connected in a bridge shape, and in particular to a semiconductor pressure sensor having low manufacturing fluctuation and method for manufacturing the same.

2. Background Art

One of pressure sensors is a semiconductor pressure sensor. In the semiconductor pressure sensor, a plurality of polysilicon gauge resistances having a piezoresistor effect are connected in a bridge shape on a diaphragm (for example, refer to National Publication of International Patent Application No. 10-511459).

SUMMARY OF THE INVENTION

A plurality of polysilicon gauge resistances are formed by patterning a polysilicon film. However, there is a problem wherein the resistances of respective polysilicon gauge resistances vary, and the desired piezoresistor cannot be obtained.

In view of the above-described problems, an object of the present invention is to provide a semiconductor pressure sensor having low manufacturing fluctuation and method for manufacturing the same.

According to the present invention, a semiconductor pressure sensor comprises: a substrate having a through-hole; a polysilicon film provided on the substrate and having a diaphragm above the through-hole; an insulating film provided on the polysilicon film; first, second, third, and forth polysilicon gauge resistances provided on the insulating film and having a piezoresistor effect; and polysilicon wirings connecting the first, second, third, and forth polysilicon gauge resistances in a bridge shape, wherein each of the first and second polysilicon gauge resistances is disposed on a central portion of the diaphragm and has a plurality of resistors connected in parallel, a structure of the first polysilicon gauge resistance is same as a structure of the second polysilicon gauge resistance, and a direction of the first polysilicon gauge resistance is same as a direction of the second polysilicon gauge resistance.

The present invention makes it possible to provide a semiconductor pressure sensor having low manufacturing fluctuation.

Other and further objects, features and advantages of the invention will appear more fully from the following description.

DETAILED DESCRIPTION OF THE PREFERRED EMBODIMENTS

Figure 1:
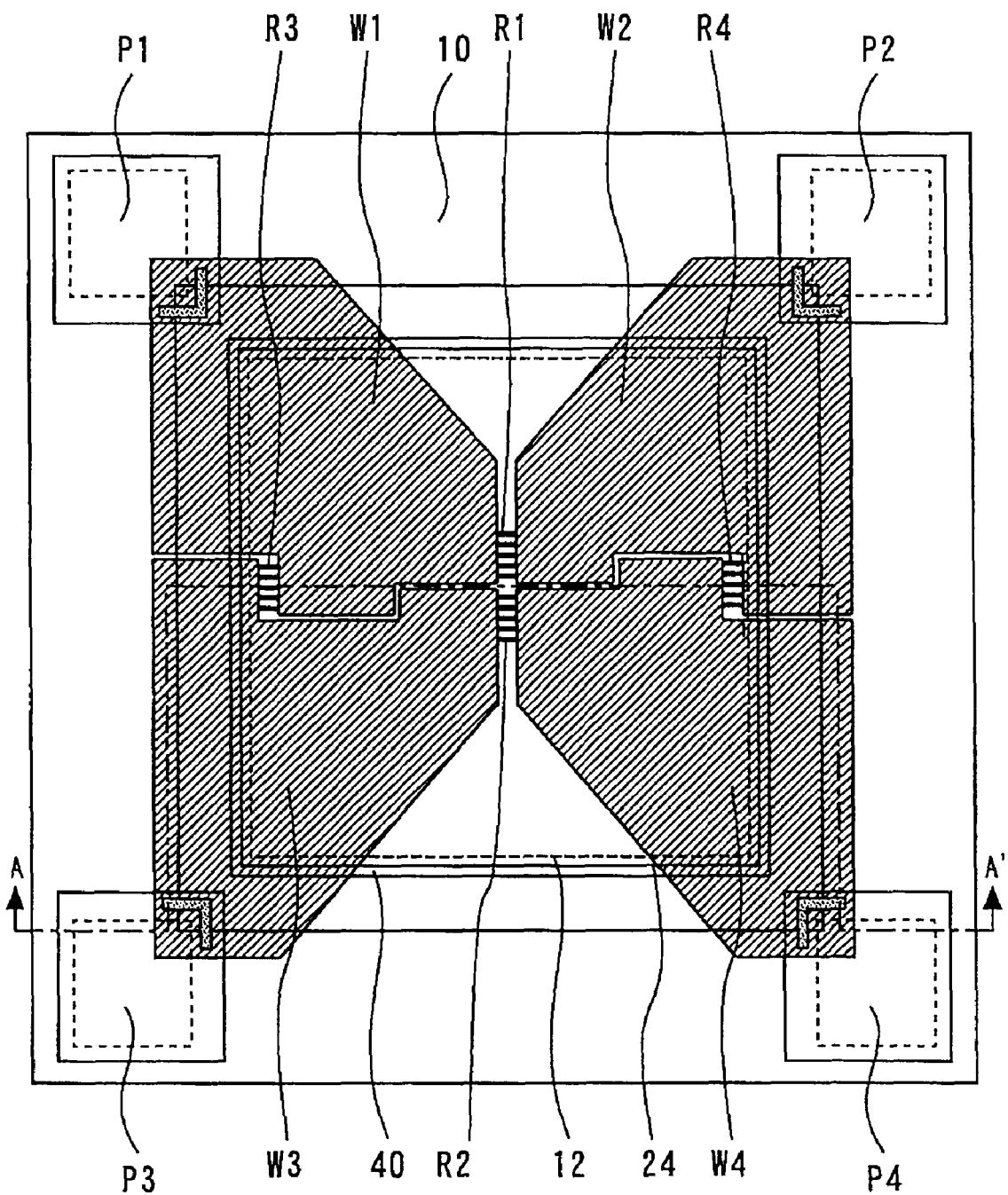
FIG. 1 is a top view showing a semiconductor pressure sensor according to the first embodiment.

The embodiments of the present invention will be described below referring to the drawings. The same components will be denoted by the same numerals, and the description thereof will be omitted.

First Embodiment

Figure 2:
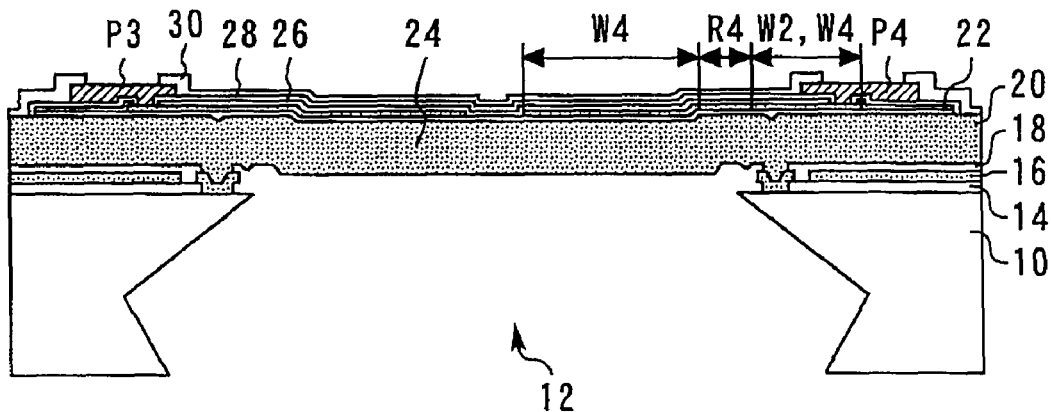
FIG. 2 is a sectional view taken along the line A-A' of FIG. 1.

FIG. 1 is a top view showing a semiconductor pressure sensor according to the first embodiment. FIG. 2 is a sectional view taken along the line A-A' of FIG. 1.

A silicon substrate 10 has a through-hole 12 in the central portion thereof. An insulating film 14, a doped polysilicon film 16, an insulating film 18, a doped polysilicon film 20, and an insulating film 22 are sequentially formed on the silicon substrate 10. The doped polysilicon film 20 has a diaphragm 24 above the through-hole 12. On the insulating film 22, polysilicon gauge resistances R1, R2, R3, and R4; and polysilicon wirings W1, W2, W3, and W4 are formed.

An insulating film 26 and a nitride film 28 are sequentially formed on the polysilicon gauge resistances R1, R2, R3, and R4; and the polysilicon wirings W1, W2, W3, and W4. Aluminum pads P1, P2, P3, and P4 are connected to the polysilicon wirings W1, W2, W3, and W4, respectively, via openings formed in the insulating film 26 and the nitride film 28. A glass coating 30 is formed on the peripheral portion of the aluminum pads P1, P2, P3, and P4; and the nitride film 28.

Figure 3:
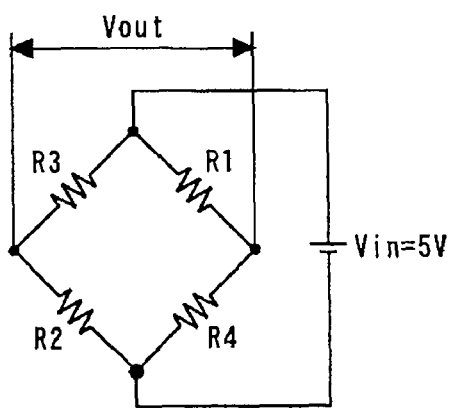
FIG. 3 is a circuit diagram of a semiconductor pressure sensor according to the first embodiment.

FIG. 3 is a circuit diagram of a semiconductor pressure sensor according to the first embodiment. The polysilicon gauge resistances R1, R2, R3, and R4 have a piezoresistor effect. The polysilicon wirings W1, W2, W3, and W4 connect the polysilicon gauge resistances R1, R2, R3, and R4 in a bridge shape. When the diaphragm 24 is displaced by pressure, the resistance of the polysilicon gauge resistances R1, R2, R3, and R4 is varied, and an output voltage Vout corresponding to the pressure is outputted.

Each of the polysilicon gauge resistances R1, R2, R3, and R4 has the same structure. Since the resistance of the polysilicon gauge resistances is little varied by the stress vertical to the current flowing direction, the direction of the polysilicon gauge resistances R1, R2, R3, and R4 is also made identical.

The polysilicon gauge resistances R1 and R2 are disposed on the central portion of the diaphragm 24. The polysilicon gauge resistances R3 and R4 are disposed on the peripheral portion of the diaphragm 24. More specifically, the polysilicon gauge resistances R3 and R4 are disposed on the center line of the diaphragm 24 and symmetrical locations across the center point of the diaphragm 24.

When a pressure is applied onto the diaphragm 24, the diaphragm 24 is displaced downward. In this case, since the polysilicon gauge resistances R3 and R4 disposed on the peripheral portions of the diaphragm 24 are subjected to tensile stress, the resistance is varied toward the positive side. The polysilicon gauge resistances R1 and R2 disposed on the central portion of the diaphragm 24 are subjected to compressive stress, the resistance is varied toward the negative side.

For example, if the resistance of each of polysilicon gauge resistances R1, R2, R3, and R4 in the initial state is 100Ω, the change of the polysilicon gauge resistances R1 and R2 and the polysilicon gauge resistances R3 and R4 when a pressure of 1 atm (0.098 MPa) is applied is +1% and −1%, respectively, and the input voltage Vin if 5 V, the output voltage Vout becomes 50 mV.

Figure 4:
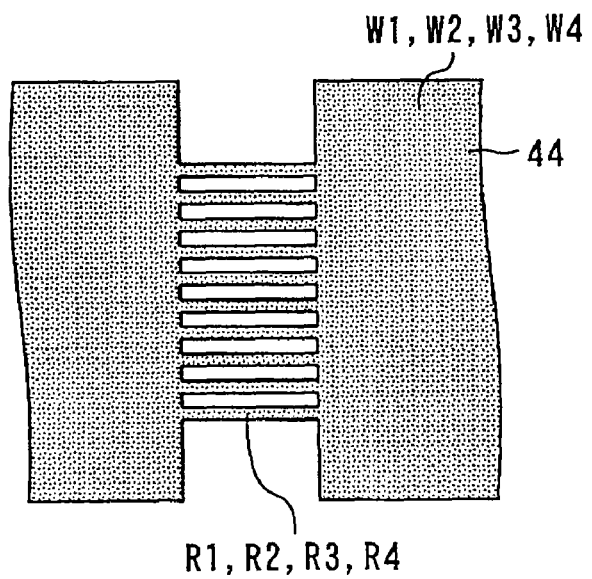
FIG. 4 is a top view showing polysilicon gauge resistances according to the first embodiment.

FIG. 4 is a top view showing polysilicon gauge resistances according to the first embodiment. Each of polysilicon gauge resistances R1, R2, R3, and R4 has a plurality of resistors connected in parallel.

A method for manufacturing a semiconductor pressure sensor according to the first embodiment will be described.

Figure 5:
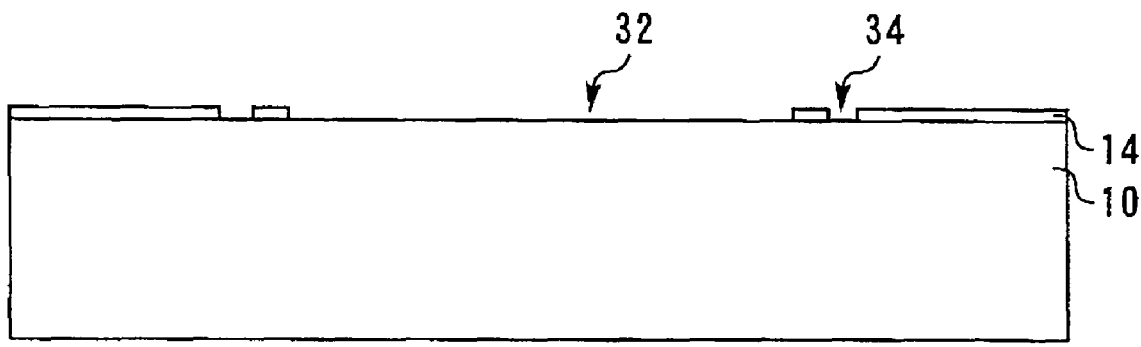
FIGS. 5 to 11 are sectional views for explaining a method for manufacturing a semiconductor pressure sensor according to the first embodiment

First, as shown in FIG. 5, an insulating film 14 such as a thermal oxide film is formed on a silicon substrate 10 having crystal orientation (100). An opening 32 is formed in the insulating film 14 in the central portion of the silicon substrate 10, and an opening 34 is formed around the opening 32.

Figure 6:
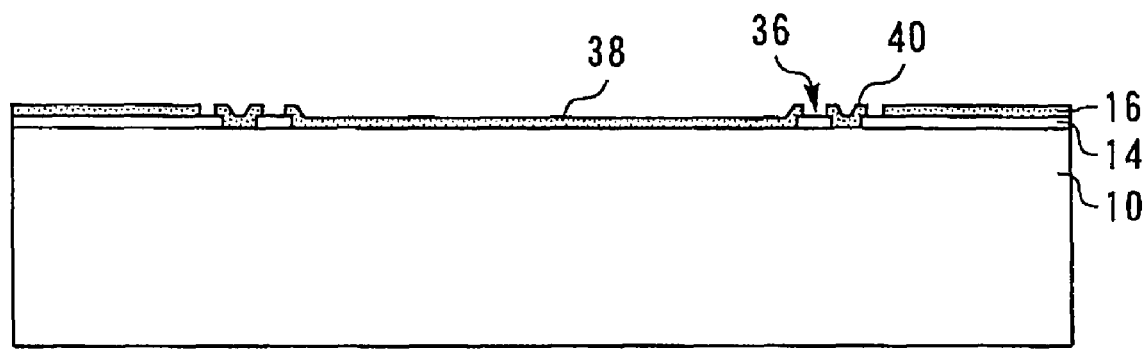

Next, as shown in FIG. 6, a doped polysilicon film 16 is formed on the silicon substrate 10 and the insulating film 14 so as to bury the opening 32 and the opening 34, and an opening 36 is formed in the doped polysilicon film 16 between the opening 32 and the opening 34. Here, the doped polysilicon film 16 buried in the opening 32 becomes a sacrifice layer 38, and the doped polysilicon film 16 buried in the opening 34 becomes an anchor 40.

Figure 7:
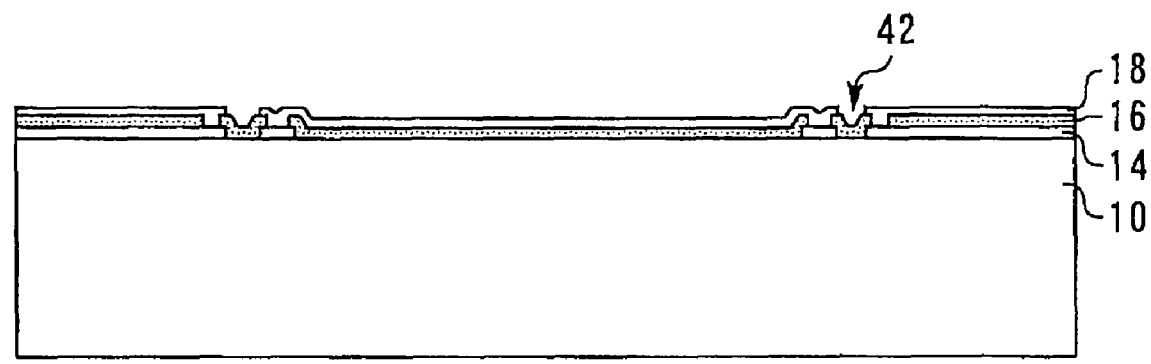

Next, as shown in FIG. 7, an insulating film 18, such as a TEOS (Tetraethyl orthosilicate) film, is formed on the insulating film 14 and the doped polysilicon film 16 so as to bury the opening 36, and an opening 42 is formed in the insulating film 18 above the anchor 40 (opening 34).

Figure 8:
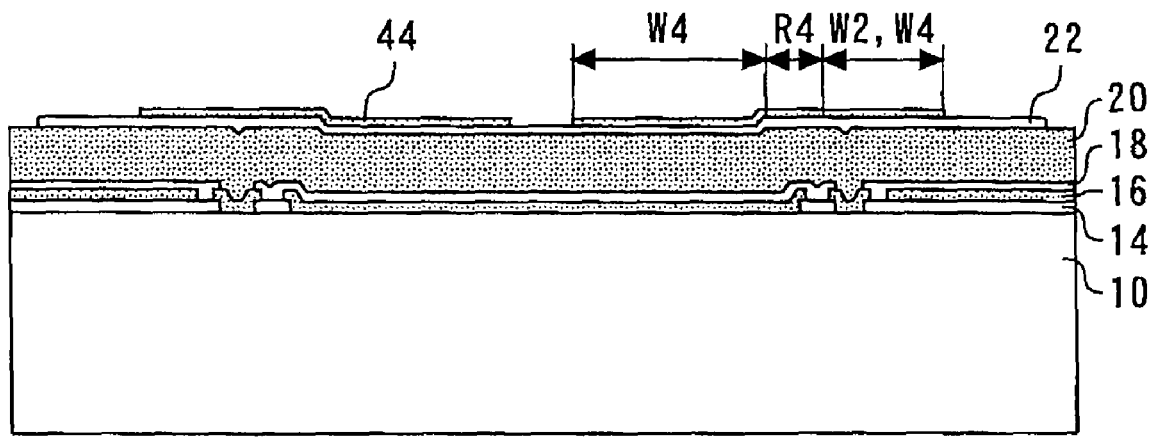

Next, as shown in FIG. 8, a doped polysilicon film 20 is formed on the doped polysilicon film 16 and the insulating film 18 so as to bury the opening 42. The doped polysilicon film 20 is connected to the anchor 40 via the opening 42. On the doped polysilicon film 20, an insulating film 22, such as an HTO (High Temperature Oxide) film, is formed by CVD (Chemical Vapor Deposition).

Next, a polysilicon film 44 is formed on the insulating film 22, and the polysilicon film 44 is patterned to simultaneously form polysilicon gauge resistances R1, R2, R3, and R4, and polysilicon wirings W1, W2, W3, and W4.

Figure 9:
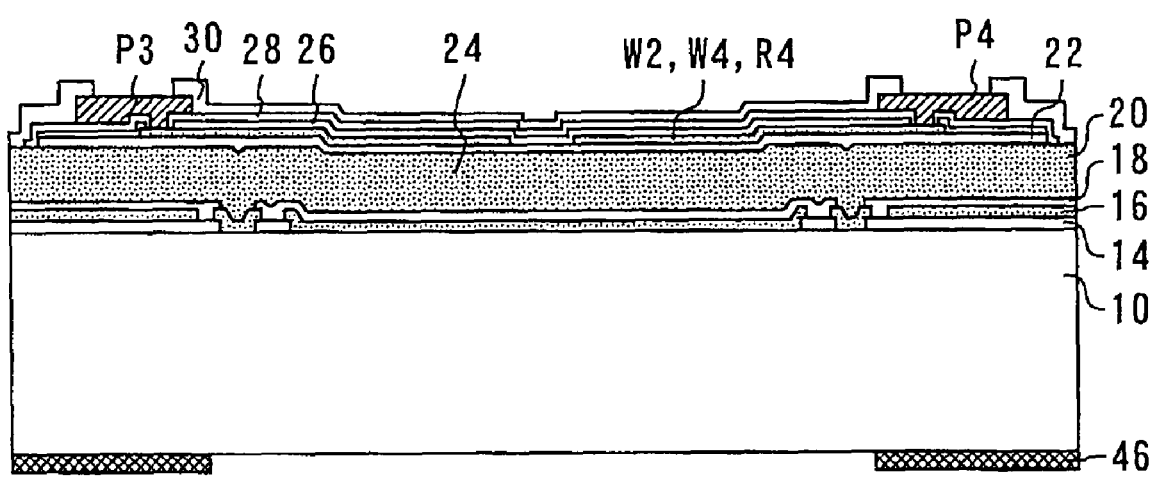

Next, as shown in FIG. 9, an insulating film 26, such as an HTO film, is formed on the polysilicon gauge resistances R1, R2, R3, and R4 and the polysilicon wirings W1, W2, W3, and W4. In this state, an impurity such as boron is implanted into the polysilicon gauge resistances R1, R2, R3, and R4, and the polysilicon wirings W1, W2, W3, and W4. A heat treatment is performed for both the activation of boron and the stress control of the diaphragm 24.

Next, a nitride film 28 is formed on the insulating film 26 by CVD. An opening is formed on each of the insulating film 26 and the nitride film 28. Aluminum pads P1, P2, P3, and P4 connected to the polysilicon wirings W1, W2, W3, and W4, respectively, are formed via the opening. On the peripheral portion section of the aluminum pads P1, P2, P3, and P4, and the nitride film 28, a glass coating 30 is formed. The silicon substrate 10 is thinned to about 200 μm, and a mask 46 is formed on the lower surface of the silicon substrate 10.

Figure 10:
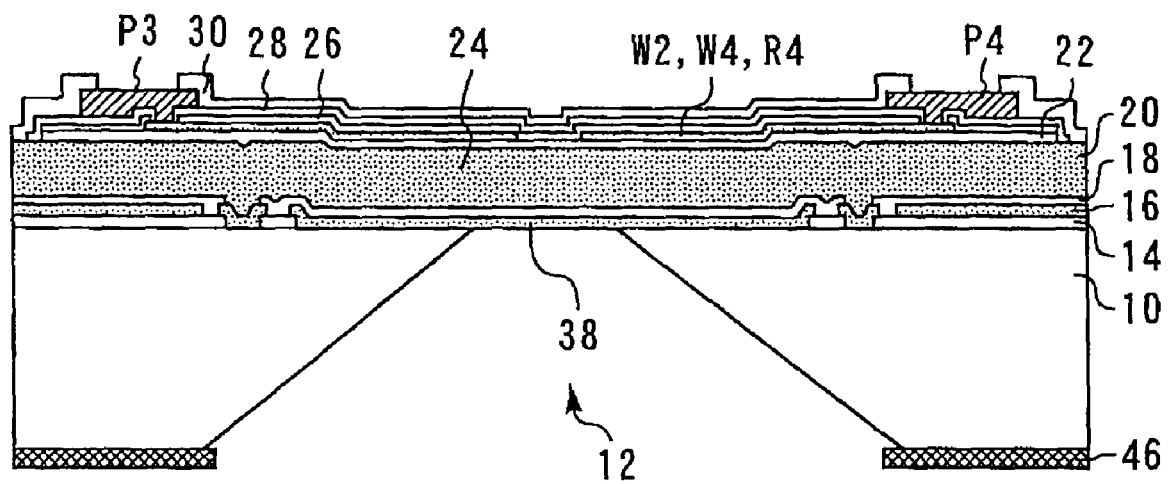

Next, as shown in FIG. 10, the silicon substrate 10 is subjected to anisotropic etching from the lower surface side by an alkali etching solution, such as a TMAH (Tetramethylammonium hydroxide) solution to form a through-hole 12 reaching the sacrifice layer 38 buried in the opening 32. The mask 46 is formed considering the superimposing misalignment of photoengraving and the quantity of side-etching.

Figure 11:
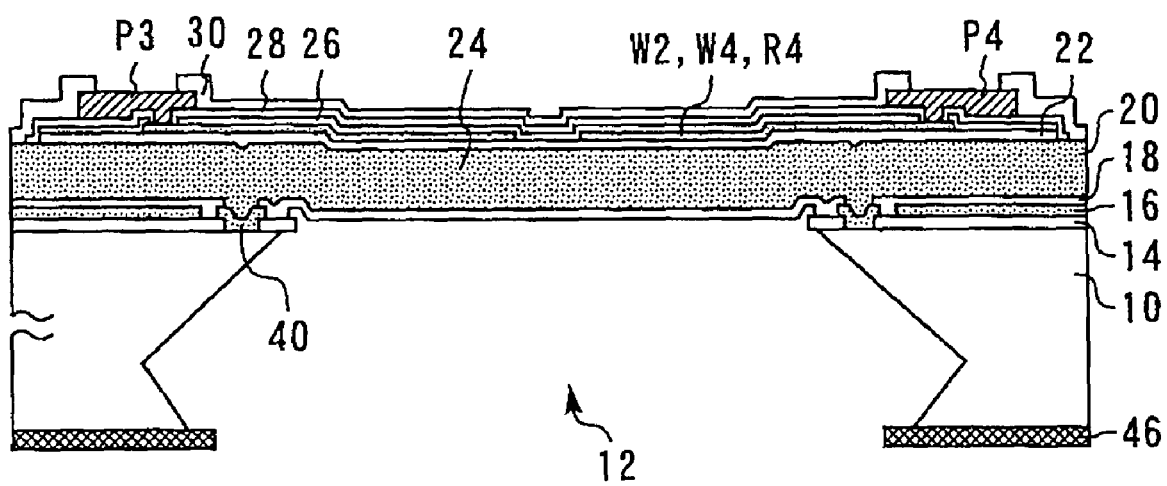

Next, as shown in FIG. 11, the sacrifice layer 38 is continuously subjected to isotropic etching by an alkali etching solution, such as a TMAH solution. Thereby, the sacrifice layer 38 is etched off selectively to the insulating film 14 and the insulating film 18. Associating to this, the silicon substrate 10 is side-etched, and a structure wherein the diaphragm 24 is supported by the anchor 40 is formed. Also in etching, the insulating film 14, the insulating film 18, and the (111) surface of the silicon substrate 10 become etching stoppers. When the TMAH solution is used, the insulating film 14 and the insulating film 18 formed of TEOS or the like have sufficient etching selection ratios to silicon and polysilicon.

By HF treatment, the insulating film 14 and the insulating film 18 disposed inside the opening 34 and the opening 42 are etched off selectively to the doped polysilicon film 16 and the doped polysilicon film 20. Thereafter, the mask 46 is removed. By the above-described processes, the semiconductor pressure sensor according to the first embodiment is manufactured.

Figure 12:
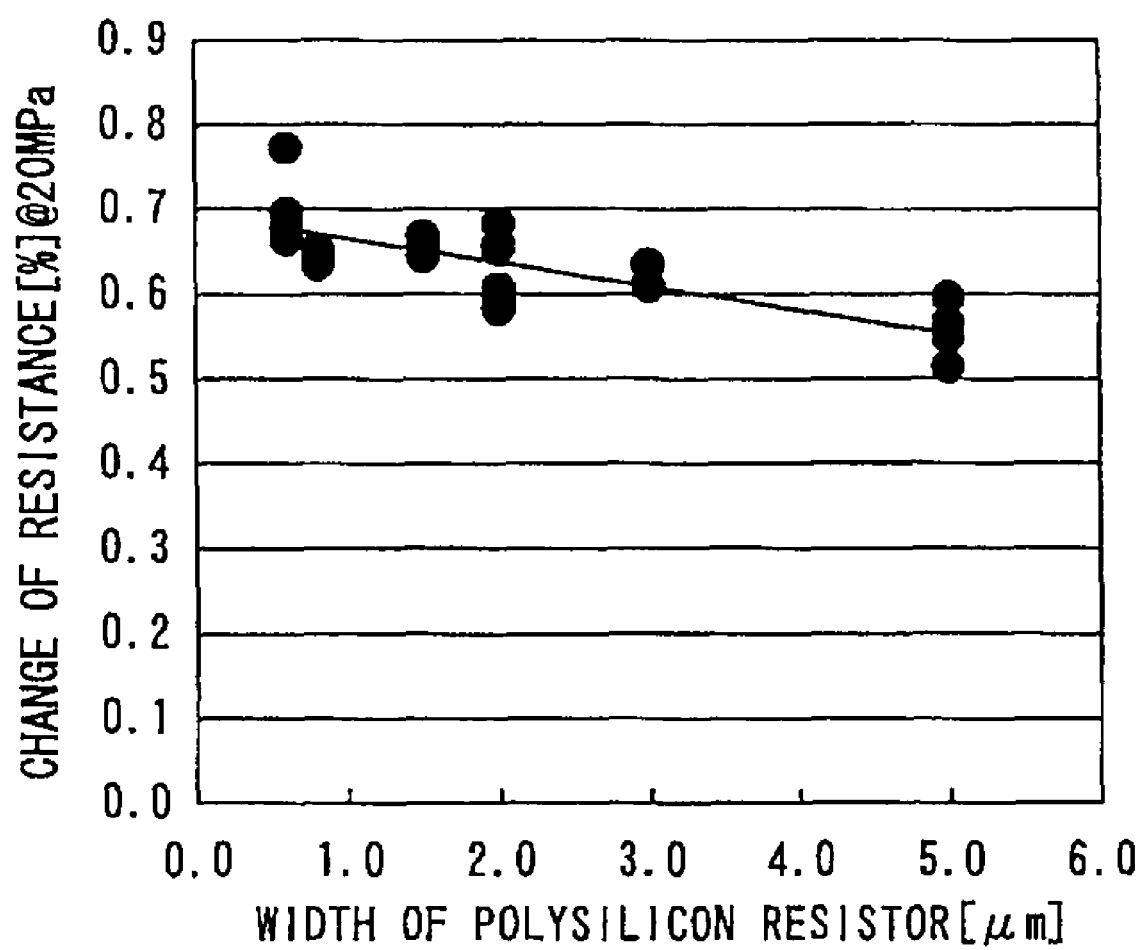
FIG. 12 is a diagram showing the relationship between the width of the polysilicon resistor and the change of resistance.

As described above, each of the polysilicon gauge resistances R1, R2, R3, and R4 has a plurality of resistors connected in parallel. Here, the piezoresistor factor of polysilicon inversely relates to impurity concentration, and further inversely relates to the width of the resistor. FIG. 12 is a diagram showing the relationship between the width of the polysilicon resistor and the change of resistance. As shown in FIG. 12, in order to obtain high sensitivity, the impurity concentration must be low, and the width of the resistor must be small. However, if the resistance is high, the fluctuation of the resistance becomes large, and there is fear that the properties are degraded. Therefore, the polysilicon gauge resistances R1, R2, R3, and R4 are made to be a plurality of resistors connected in parallel. Thereby, since the fluctuation of resistance can be decreased when the structure is formed by patterning the polysilicon film, an optimal piezoresistor can be obtained. Therefore, semiconductor pressure sensors having low manufacturing fluctuation can be obtained.

Since the area of the diaphragm 24 is determined by the area of the region of the doped polysilicon film 20 supported by the anchor 40, it can be controlled with a high accuracy. Since the thickness of the diaphragm 24 is determined by the CVD deposition thickness of the doped polysilicon film 20, it can be controlled with a high accuracy, and easily thinned. Since the locations for forming the polysilicon gauge resistances R1, R2, R3, and R4 are determined by the accuracy of only the surface side of photoengraving, it can be controlled with a high accuracy.

Figure 13:
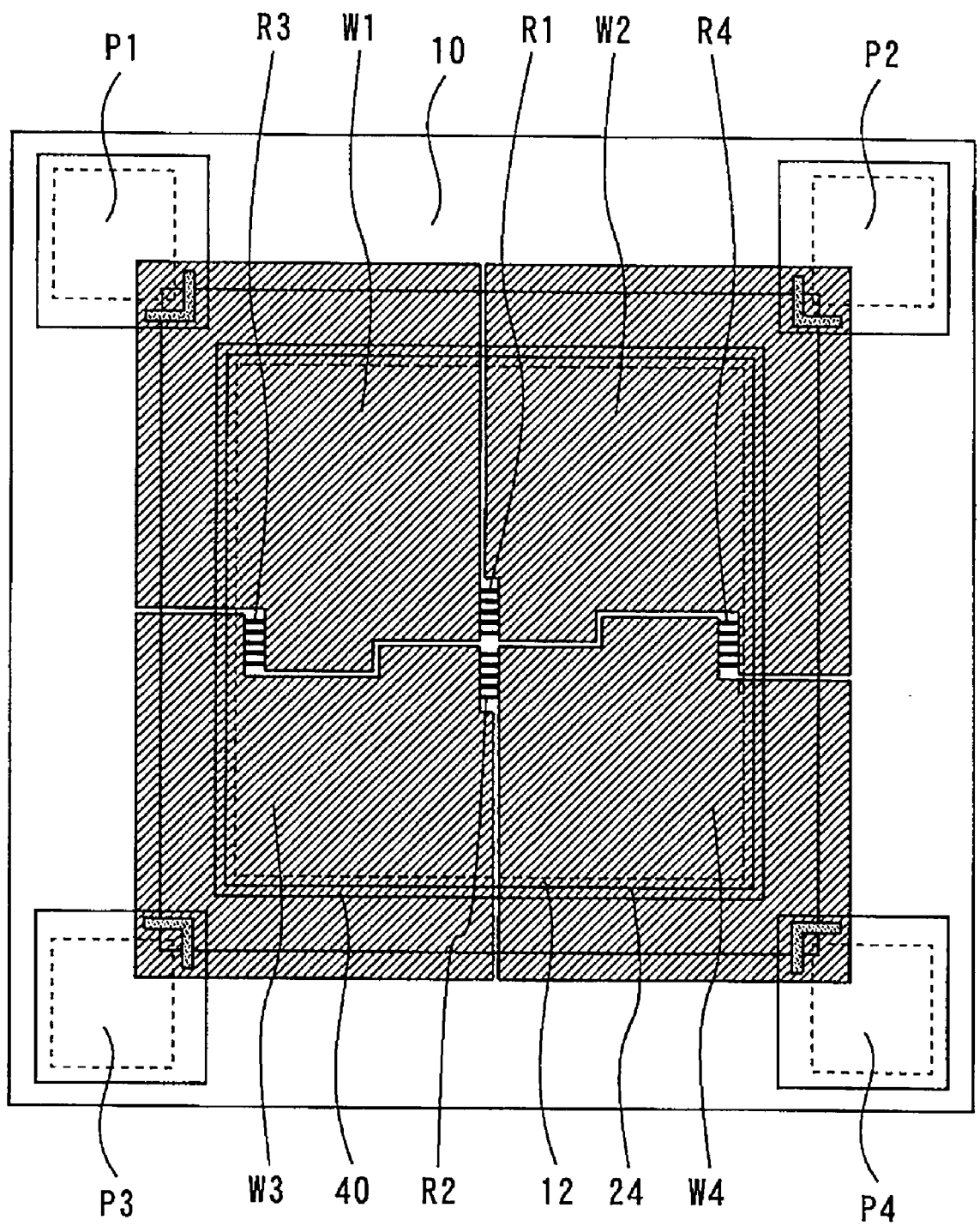
FIG. 13 is a top view showing a first modified example of the semiconductor pressure sensor according to the first embodiment.

FIG. 13 is a top view showing a first modified example of the semiconductor pressure sensor according to the first embodiment. Unlike the semiconductor pressure sensor shown in FIG. 1, polysilicon wirings W1, W2, W3, and W4 cover the substantially all the surface of the diaphragm 24. Thereby, stress applied onto the diaphragm 24 can be made to be uniform, and measuring accuracy is improved.

Figure 14:
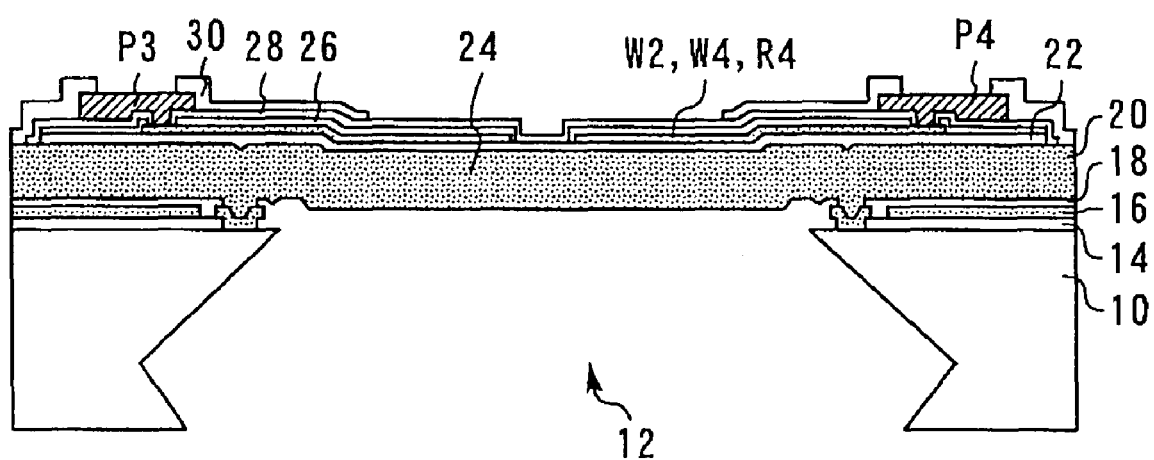
FIG. 14 is a sectional view showing a second modified example of the semiconductor pressure sensor according to the first embodiment.

FIG. 14 is a sectional view showing a second modified example of the semiconductor pressure sensor according to the first embodiment. The glass coating 30 on the diaphragm 24 is removed. Thereby, the effect of the stress of the glass coating 30 onto the diaphragm 24 can be removed. In addition, the glass coating 30 on the polysilicon gauge resistances R1, R2, R3, and R4 may be left, and other glass coating 30 on the diaphragm 24 may be removed.

Figure 15:
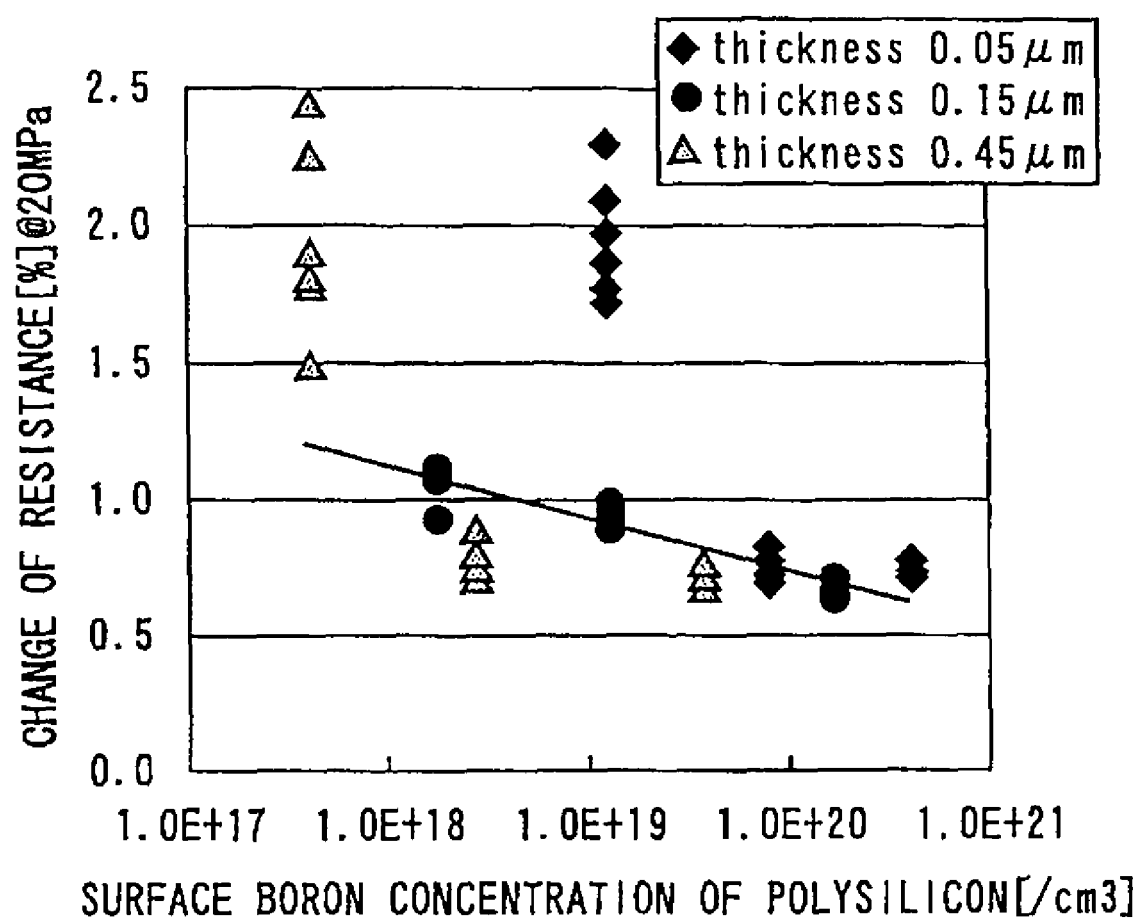
FIG. 15 is a diagram showing the change of resistance relative to the surface boron concentration of polysilicon.

FIG. 15 is a diagram showing the change of resistance relative to the surface boron concentration of polysilicon. The cases where the thickness of polysilicon was 0.05 μm, 0.15 μm and 0.45 μm were observed. As a result, when the thickness was 0.15 μm, a logarithmic approximation was produced in the change of resistance and the concentration of surface boron, and fluctuation was small. Therefore, it is preferable that the thickness of each of the polysilicon gauge resistances R1, R2, R3, and R4 be made to be 0.1 to 0.3 μm. Thereby, a polysilicon gauge resistance with a high piezoresistor effect and a low fluctuation can be obtained.

Second Embodiment

A polysilicon gauge resistance according to the second embodiment and a manufacturing method thereof will be described focusing only aspects different from the first embodiment.

Figure 16:
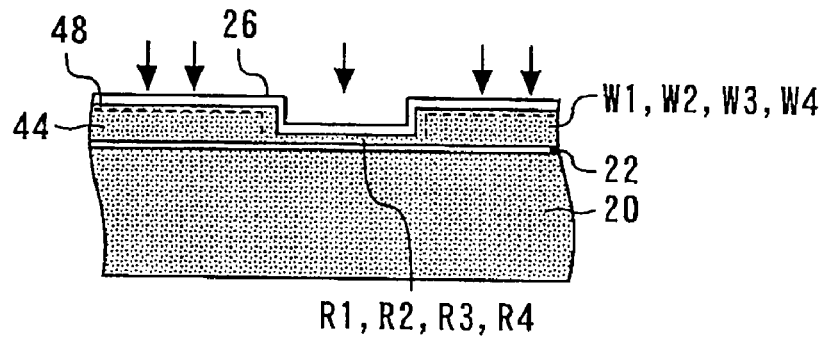
FIG. 16 is a sectional view showing a polysilicon gauge resistance according to the second embodiment.
Figure 17:
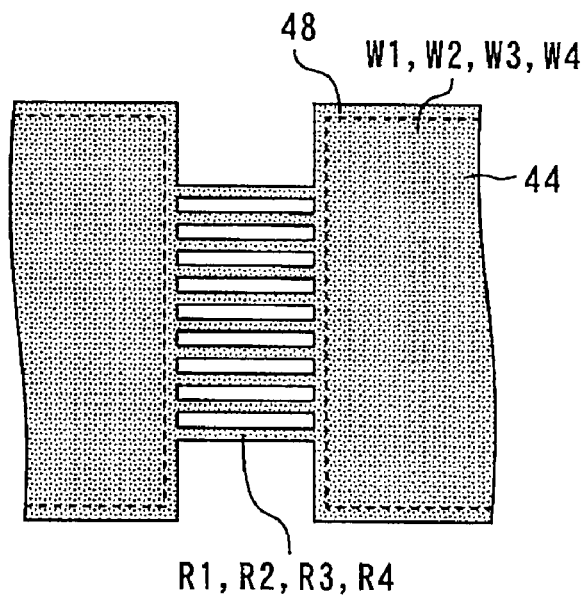
FIG. 17 is a top view showing the polysilicon gauge resistance according to the second embodiment.

FIG. 16 is a sectional view showing a polysilicon gauge resistance according to the second embodiment; and FIG. 17 is a top view showing the polysilicon gauge resistance according to the second embodiment. In the present embodiment, polysilicon gauge resistances R1, R2, R3, and R4 are thinner than polysilicon wirings W1, W2, W3, and W4. Thereby, since the cross-sectional area of the polysilicon gauge resistances R1, R2, R3, and R4 can be small, and the piezoresistor can be large, the measuring accuracy is improved. Also, the polysilicon wirings W1, W2, W3, and W4 can be thickened to lower wiring resistance.

Next, a method for manufacturing a polysilicon gauge resistance according to the second embodiment will be described. First, a polysilicon film 44 of a thickness of 0.3 μm or more is formed on an insulating film 22. Then the polysilicon film 44 is subjected to patterning to form polysilicon wirings W1, W2, W3, and W4.

Next, a polysilicon film 48 thinner than the polysilicon film 44 is formed on the entire surface of the insulating film 22 so as to cover the polysilicon wirings W1, W2, W3, and W4. At this time, the polysilicon film 48 is made to surround the peripheral portion of the polysilicon wirings W1, W2, W3, and W4 by 1 μm or more. Then, by patterning the polysilicon film 48, polysilicon gauge resistances R1, R2, R3, and R4 are formed.

Next, an insulating film 26, such as an HTO film is formed on the polysilicon gauge resistances R1, R2, R3, and R4, and the polysilicon wirings W1, W2, W3, and W4. Then, an impurity, such as boron, is implanted into the entire surface. The impurity is activated by a heat treatment performed in the subsequent process.

As described above, since the polysilicon gauge resistances R1, R2, R3, and R4 are thinner than the polysilicon wirings W1, W2, W3, and W4, the cross-sectional area of the polysilicon gauge resistances R1, R2, R3, and R4 can be reduced and the piezoresistor can be enlarged; therefore, the measuring accuracy can be improved. Alternatively, the polysilicon wirings W1, W2, W3, and W4 can be thickened to lower the wiring resistance.

Figure 18:
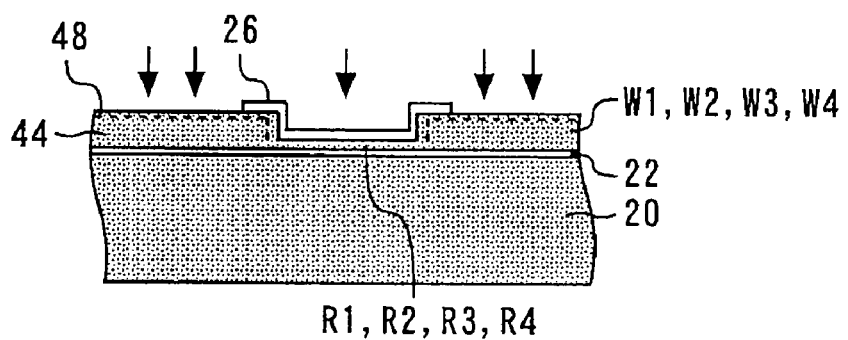
FIG. 18 is a sectional view showing a modified example of the method for manufacturing the polysilicon gauge resistance according to the second embodiment.

Under an implantation condition wherein the impurity concentration of the polysilicon gauge resistances R1, R2, R3, and R4 becomes optimal, the impurity may not sufficiently deeply diffused into the polysilicon wirings W1, W2, W3, and W4. In such a case, as shown in FIG. 18, an insulating film 26 is formed on the polysilicon gauge resistances R1, R2, R3, and R4, and an opening is formed in the insulating film 26 on the polysilicon wirings W1, W2, W3, and W4. Then, an impurity is implanted into the polysilicon wirings W1, W2, W3, and W4 using the insulating film 26 as a mask.

Thereby, the impurity can be sufficiently deeply diffused in the polysilicon wirings W1, W2, W3, and W4 even under the same implanting conditions. Also, the impurity concentration of the polysilicon gauge resistances R1, R2, R3, and R4 becomes lower than the impurity concentration of the polysilicon wirings W1, W2, W3, and W4. Therefore, the piezo resistance can be elevated while reducing the wiring resistance and the measuring accuracy can be improved.

Third Embodiment

Figure 19:
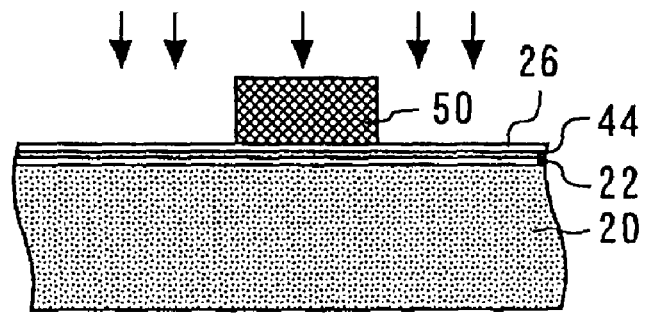
FIG. 19 is a top view showing the method for manufacturing the polysilicon gauge resistance according to the third embodiment.
Figure 20:
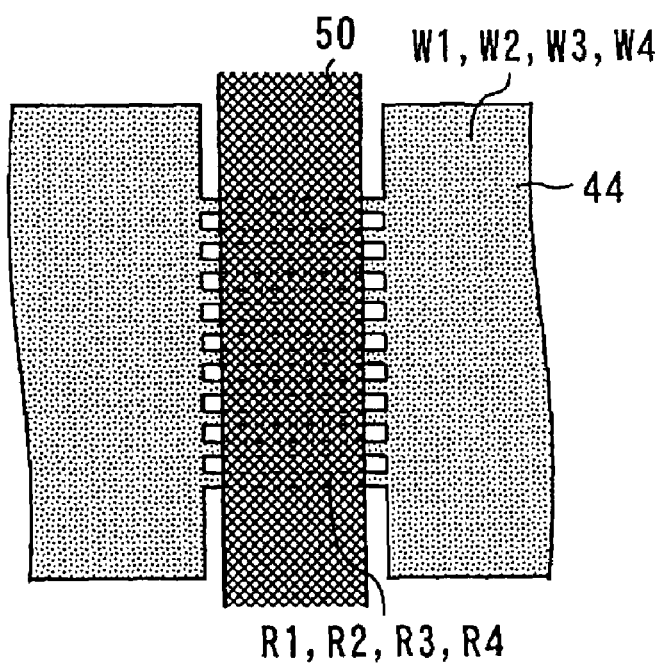
FIG. 20 is a sectional view showing the method for manufacturing the polysilicon gauge resistance according to the third embodiment.

A method for manufacturing a polysilicon gauge resistance according to the third embodiment will be described focusing only aspects different from the first embodiment. FIG. 19 is a top view showing the method for manufacturing the polysilicon gauge resistance according to the third embodiment, and FIG. 20 is a sectional view thereof.

First, a thin polysilicon film 44 is formed on the insulating film 22, and the polysilicon film 44 is subjected to patterning to form polysilicon gauge resistances R1, R2, R3, and R4, and polysilicon wirings W1, W2, W3, and W4.

Next, an insulating film 26, such as an HTO film, is formed on the polysilicon gauge resistances R1, R2, R3, and R4 and the polysilicon wirings W1, W2, W3, and W4. Then, an impurity, such as boron, is implanted under conditions wherein the impurity concentration of the polysilicon gauge resistances R1, R2, R3, and R4 becomes optimal.

Next, a photoresist 50 is formed on the polysilicon gauge resistances R1, R2, R3, and R4. More specifically, the photoresist 50 is disposed inside a plurality of resistors connected in parallel of the polysilicon gauge resistances R1, R2, R3, and R4. Then, an impurity, such as boron, is implanted into the polysilicon wirings W1, W2, W3, and W4 using the insulating film 26 as a mask under conditions wherein the impurity concentration of the polysilicon wirings W1, W2, W3, and W4 becomes optimal. At this time, the photoresist 50 is disposed considering the diffusion distance. The impurity is activated by the heat treatment performed in the subsequent process.

Thereby, the impurity concentration of the polysilicon gauge resistances R1, R2, R3, and R4 becomes lower than the impurity concentration of the polysilicon wirings W1, W2, W3, and W4. Therefore, the piezo resistance can be elevated while reducing the wiring resistance and the measuring accuracy can be improved.

Figure 21:
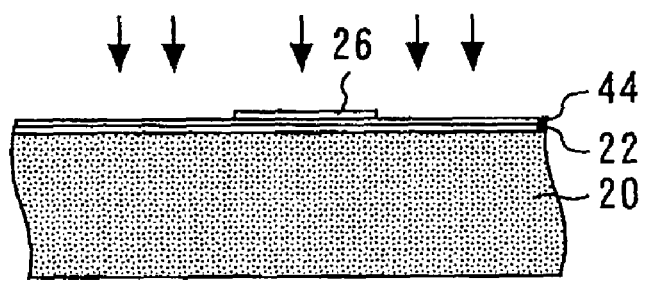
FIG. 21 is a sectional view showing a modified example of the method for manufacturing the polysilicon gauge resistance according to the third embodiment.
Figure 22:
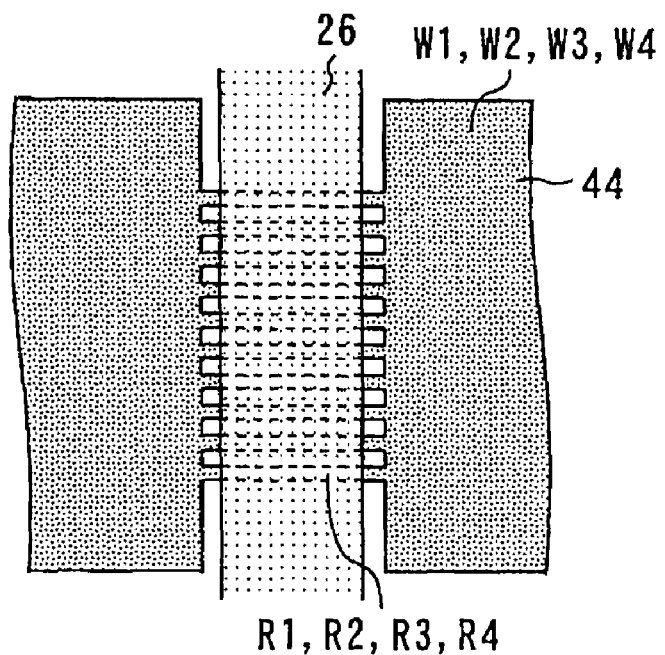
FIG. 22 is a top view showing a modified example of the method for manufacturing the polysilicon gauge resistance according to the third embodiment.

Alternatively, the photoresist 50 may not be used, and as shown in FIGS. 21 and 22, the insulating film 26 may be formed on the polysilicon gauge resistances R1, R2, R3, and R4; an opening may be formed on the insulating film 26 on the polysilicon wirings W1, W2, W3, and W4; and the impurity may be implanted into the polysilicon wirings W1, W2, W3, and W4 using the insulating film 26 as a mask. Thereby, the equivalent effect can be obtained.

Fourth Embodiment

A method for manufacturing a semiconductor pressure sensor according to the fourth embodiment will be described focusing only aspects different from the first embodiment.

Figure 23:
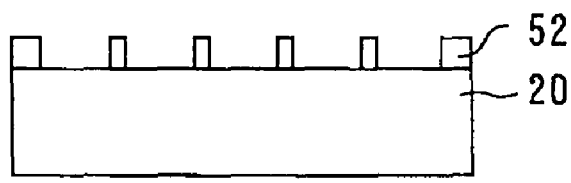
FIGS. 23 to 25 and 27 are sectional views for explaining a method for manufacturing a semiconductor pressure sensor according to the fourth embodiment.

First, as shown in FIG. 23, an insulating film 52, such as an HTO film is formed on the doped polysilicon film 20. The insulating film 52 is subjected to patterning in convex shapes arrayed in parallel.

Figure 24:
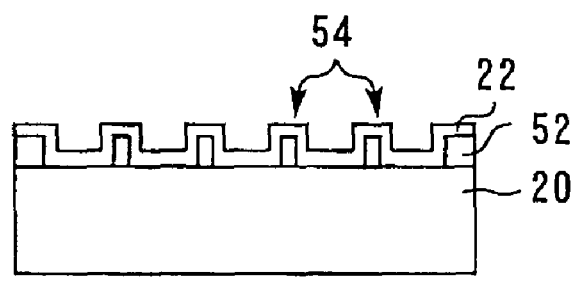

Next, as shown in FIG. 24, an insulating film 22 is formed on the entire surface. Since the insulating film 22 is formed on the patterned insulating film 52, the insulating film 22 has a plurality of convex portions 54.

Figure 25:
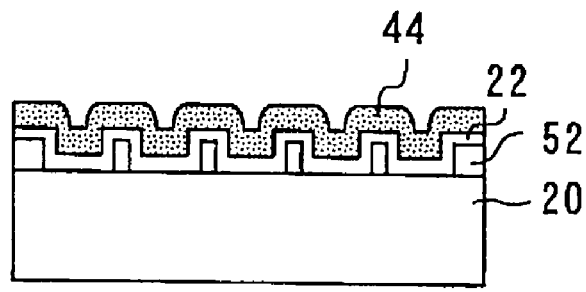
Figure 26:
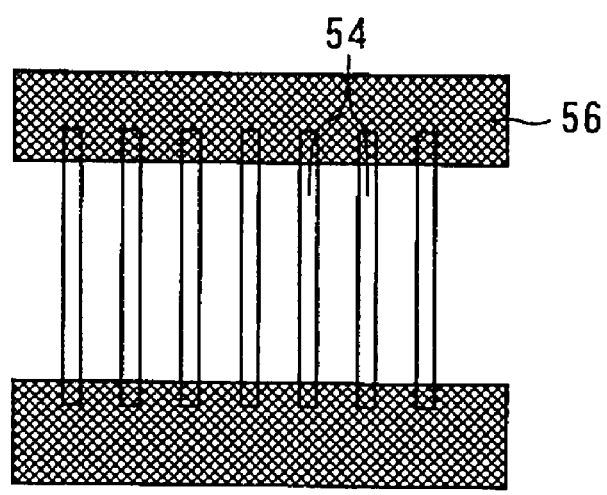
FIGS. 26 and 28 are top views for explaining a method for manufacturing a semiconductor pressure sensor according to the fourth embodiment.

Next, as shown in FIG. 25, a polysilicon film 44 is formed on the entire surface. Then, as shown in FIG. 26, a resist 56 is formed so as to surround the convex portions 54 of the insulating film 22.

Figure 27:
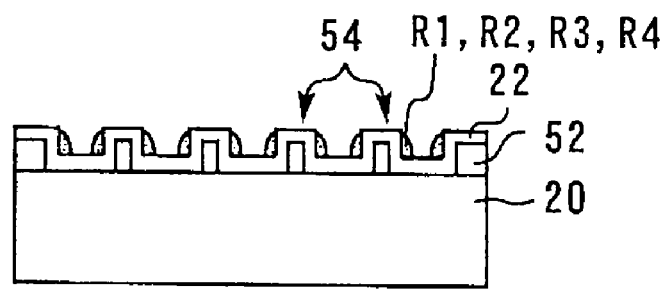
Figure 28:
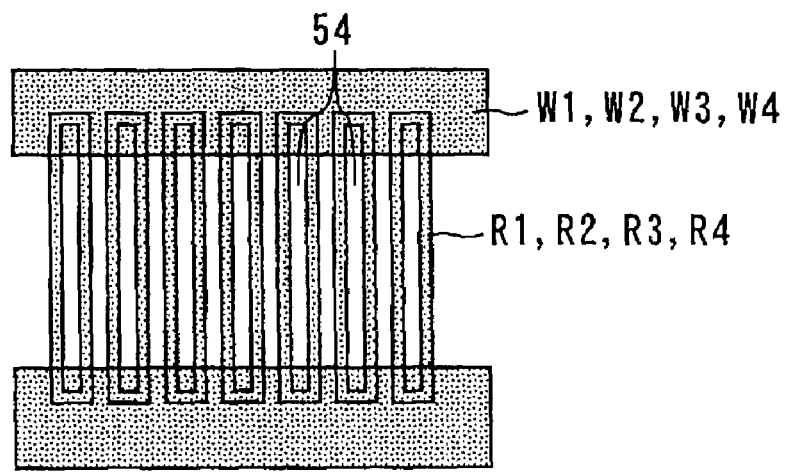

Next, as shown in FIGS. 27 and 28, the polysilicon film 44 is subjected to anisotropic etching so as to leave the polysilicon film 44 as the side walls provided on the side surfaces of the convex portions 54, to form the polysilicon gauge resistances R1, R2, R3, and R4. At this time, the polysilicon wirings W1, W2, W3, and W4 are also simultaneously formed. Thereafter, an impurity such as boron is implanted so as to activate the impurity by heat treatment.

As described above, by forming the polysilicon gauge resistances R1, R2, R3, and R4 as side walls, the polysilicon gauge resistances R1, R2, R3, and R4 having small cross-sectional areas can be formed without depending on photoengraving performance. Since the piezoresistor effect of polysilicon inversely relates to the cross-sectional area, a semiconductor pressure sensor with a high sensitivity can be obtained.

Fifth Embodiment

A method for manufacturing a semiconductor pressure sensor according to the fifth embodiment will be described focusing only aspects different from the first embodiment.

Figure 29:
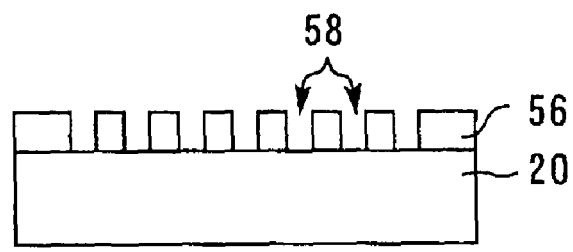
FIGS. 29 to 31 and 33 are sectional views for explaining a method for manufacturing a semiconductor pressure sensor according to the fifth embodiment.

First, as shown in FIG. 29, an insulating film 56 such as an HTO film is formed on the doped polysilicon film 20. A plurality of concave portions 58 arrayed in parallel are formed in the insulating film 56.

Figure 30:
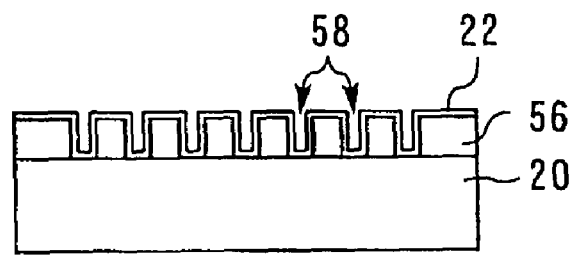

Next, as shown in FIG. 30, an insulating film 22 is formed on the insulating film 56 so as to cover the inside of the plurality of concave portions 58.

Figure 31:
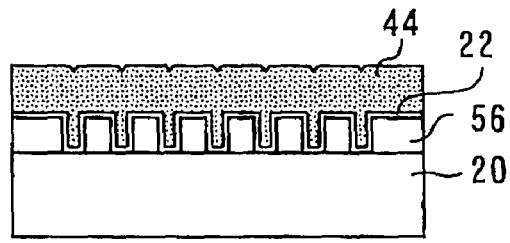
Figure 32:
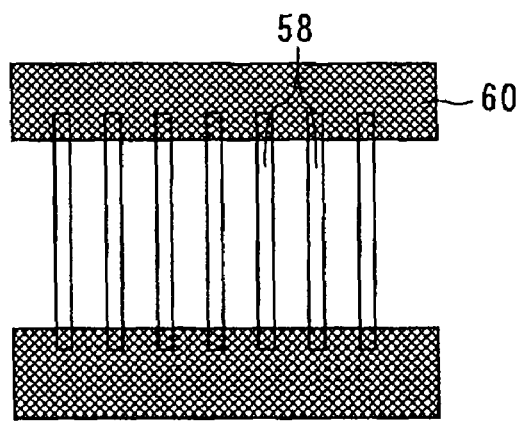
FIGS. 32 and 34 are top views for explaining a method for manufacturing a semiconductor pressure sensor according to the fifth embodiment.

Next, as shown in FIG. 31, a polysilicon film 44 is formed on the insulating film 22 so as to bury the plurality of concave portions 58 covered by the insulating film 22. Then, as shown in FIG. 32, a resist 60 is formed so as to surround the plurality of concave portions 58.

Figure 33:
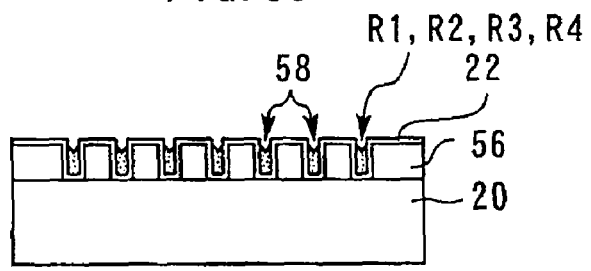
Figure 34:
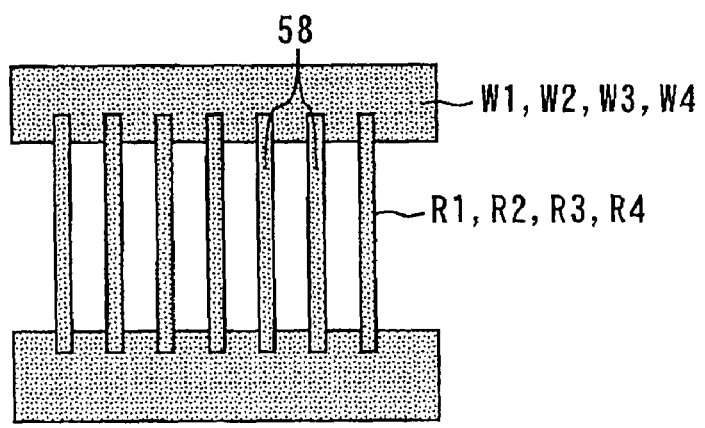

Next, as shown in FIGS. 33 and 34, the polysilicon film 44 is subjected to anisotropic etching so as to leave the polysilicon film 44 in the plurality of concave portions 58 to form polysilicon gauge resistances R1, R2, R3, and R4 buried in the plurality of concave portions 58. At this time, polysilicon wirings W1, W2, W3, and W4 are also simultaneously formed. Thereafter, an impurity such as boron is implanted, and the impurity is activated by heat treatment.

In the above-described process, by controlling the thickness of the insulating film 22 covering the inside of the plurality of concave portions 58, the polysilicon gauge resistances R1, R2, R3, and R4 having small cross-sectional areas can be formed without depending on photoengraving performance. Since the piezoresistor effect of polysilicon inversely relates to the cross-sectional area, a semiconductor pressure sensor with a high sensitivity can be obtained.

Sixth Embodiment

Figure 35:
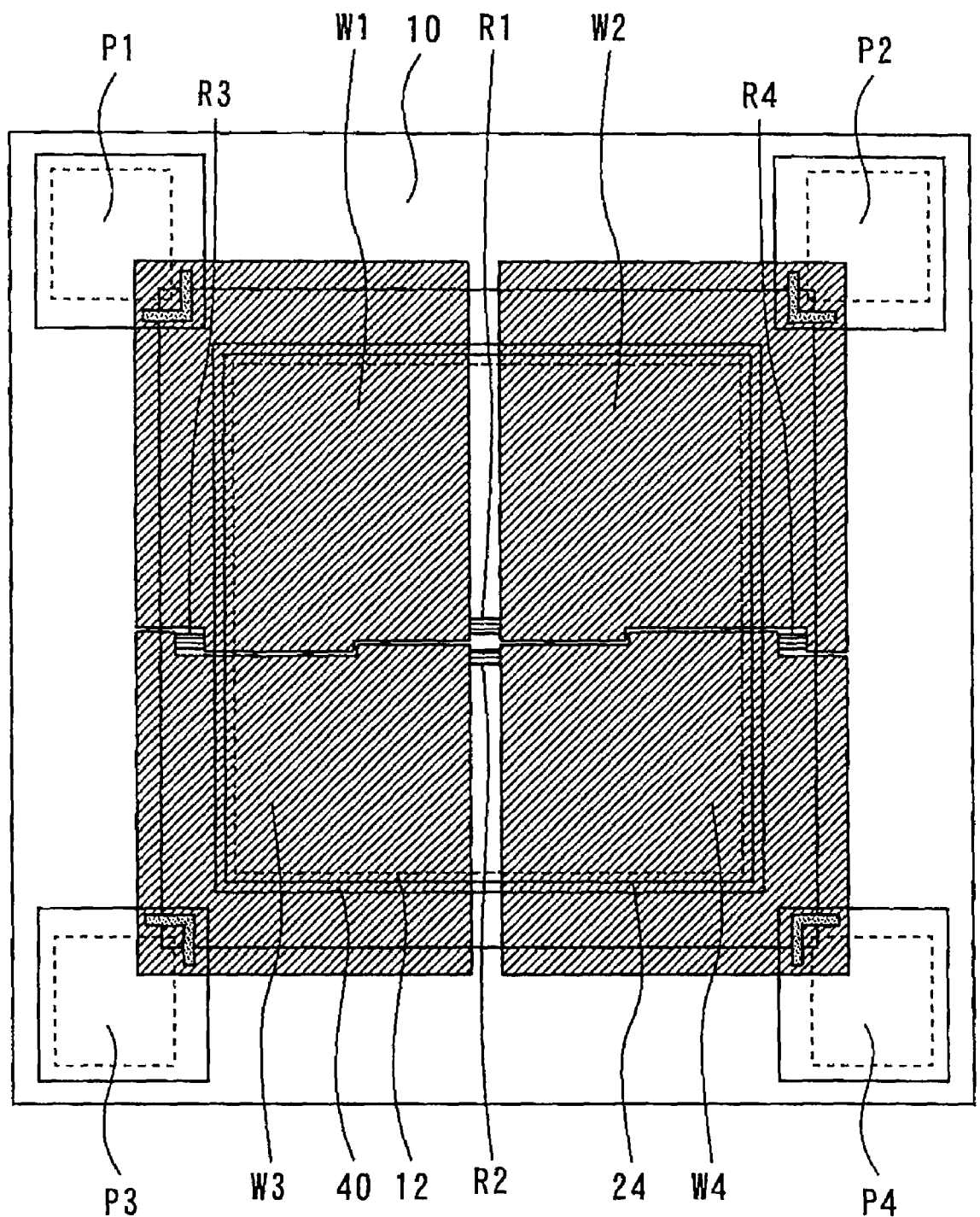
FIG. 35 is a top view showing a semiconductor pressure sensor according to the sixth embodiment.

A semiconductor pressure sensor according to the sixth embodiment will be described focusing only aspects different from the first embodiment. FIG. 35 is a top view showing a semiconductor pressure sensor according to the sixth embodiment.

The polysilicon gauge resistances R3 and R4 are disposed outside the diaphragm 24. Therefore, only the resistance of the polysilicon gauge resistances R1 and R2 varies in response to the displacement of the diaphragm 24.

Here, since the piezoresistor effect of polysilicon inversely relates to the cross-sectional area of the resistor, in order to elevate sensitivity, the resistor must be widened and the film must be thinned. However, the fluctuation of the resistor width is enlarged by the effects of the accuracy of photoengraving and the accuracy of etching, and further, if the resistor width is reduced, the effect of fluctuation is enlarged. While, extremely adjacent polysilicon gauge resistances R1 and R2 can be stably formed. Therefore, the accuracy of the semiconductor pressure sensor can be elevated.

Since only the resistance of the polysilicon gauge resistances R1 and R2 changes responding to the displacement of the diaphragm 24, sensitivity to pressure is lowered. However, since the tensile stress generated in the peripheral portion of the diaphragm 24 is only about one-third of the compressive stress generated in the central portion of the diaphragm 24, the sensitivity lowers by about 20%.

Figure 36:
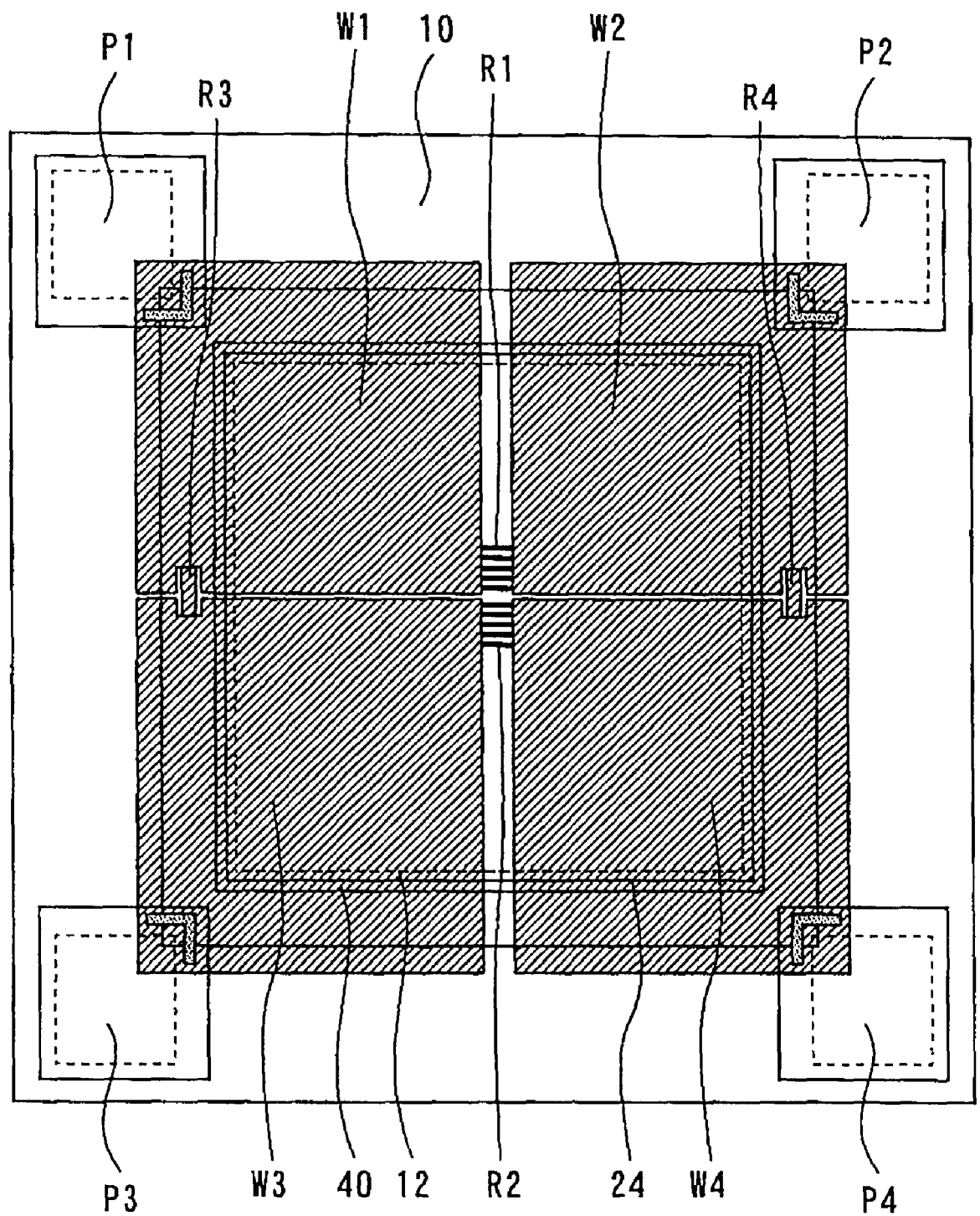
FIG. 36 is a top view showing a modified example of the semiconductor pressure sensor according to the sixth embodiment.

FIG. 36 is a top view showing a modified example of the semiconductor pressure sensor according to the sixth embodiment. The polysilicon gauge resistances R3 and R4 have a structure different from the structure of the polysilicon gauge resistances R1 and R2, and have a lower resistance than the polysilicon gauge resistances R1 and R2. Thereby, since the fluctuation of the resistance of the polysilicon gauge resistances R3 and R4 can be suppressed, the fluctuation of the offset voltage can be suppressed.

Seventh Embodiment

Figure 37:
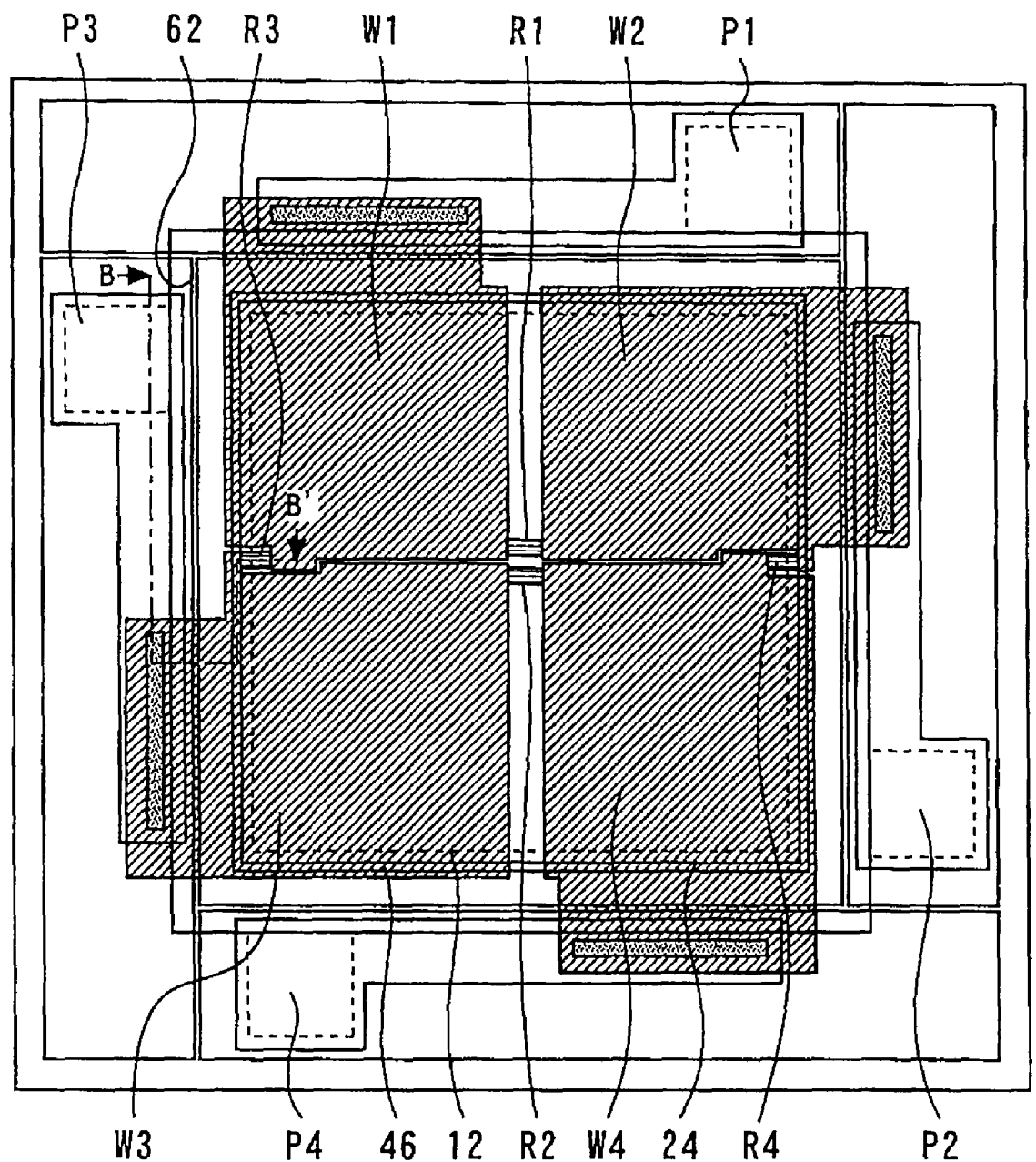
FIG. 37 is a top view showing a semiconductor pressure sensor according to the seventh embodiment.
Figure 38:
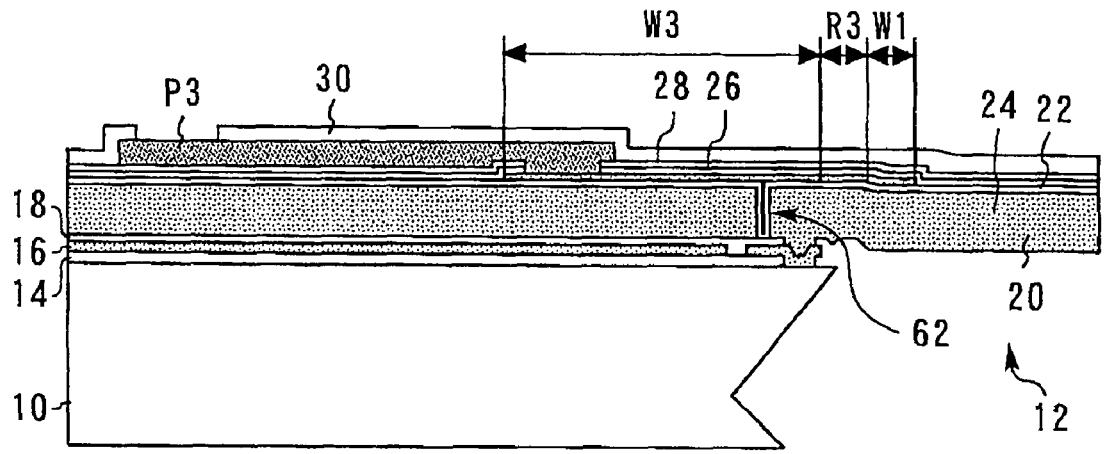
FIG. 38 is a sectional view taken along the line B-B' in FIG. 37.

A semiconductor pressure sensor according to the seventh embodiment will be described focusing only aspects different from the first embodiment. FIG. 37 is a top view showing a semiconductor pressure sensor according to the seventh embodiment. FIG. 38 is a sectional view taken along the line B-B' in FIG. 37.

The doped polysilicon film 20 in the peripheral region wherein the aluminum pads P1, P2, P3, and P4 and the aluminum wirings are disposed is separated from the doped polysilicon film 20 in the central region wherein the diaphragm 24 is formed by a separating channel 62. The separating channel 62 is buried with the insulating film 22.

Thereby, the transmission of the film stress of the aluminum pads P1, P2, P3, and P4 and the aluminum wirings, and the impact of bonding to the diaphragm 24 can be prevented. Therefore, since the distance between the diaphragm 24 and the aluminum pads P1, P2, P3, and P4 can be shortened, further size reduction becomes feasible.

Figure 39:
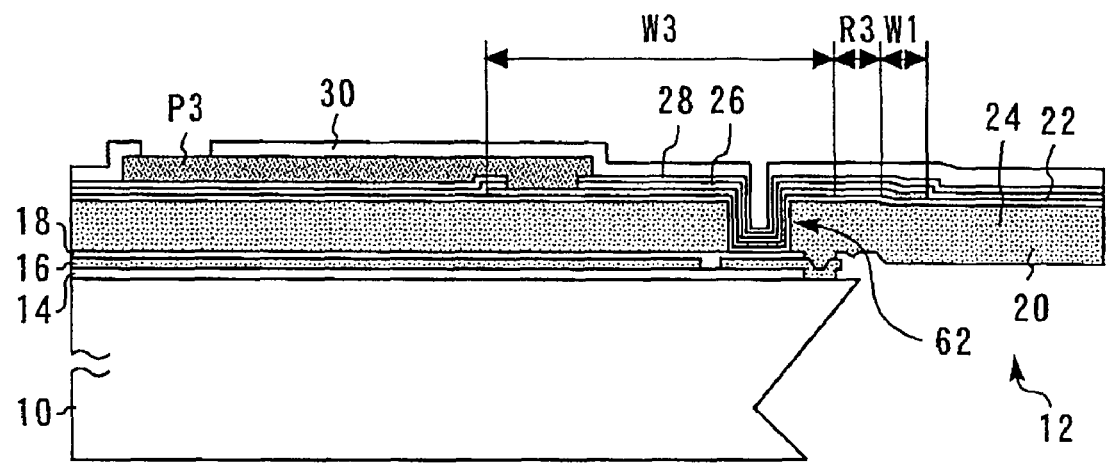
FIG. 39 is a sectional view showing a modified example of the semiconductor pressure sensor according to the seventh embodiment.

FIG. 39 is a sectional view showing a modified example of the semiconductor pressure sensor according to the seventh embodiment. The separating channel 62 is buried with the polysilicon wirings W1, W2, W3, and W4. Thereby, the separating channel 62 can be sufficiently buried. Also, if the polysilicon wirings W1, W2, W3, and W4 is thickened as in the second embodiment, these can be easily formed.

Eighth Embodiment

Figure 40:
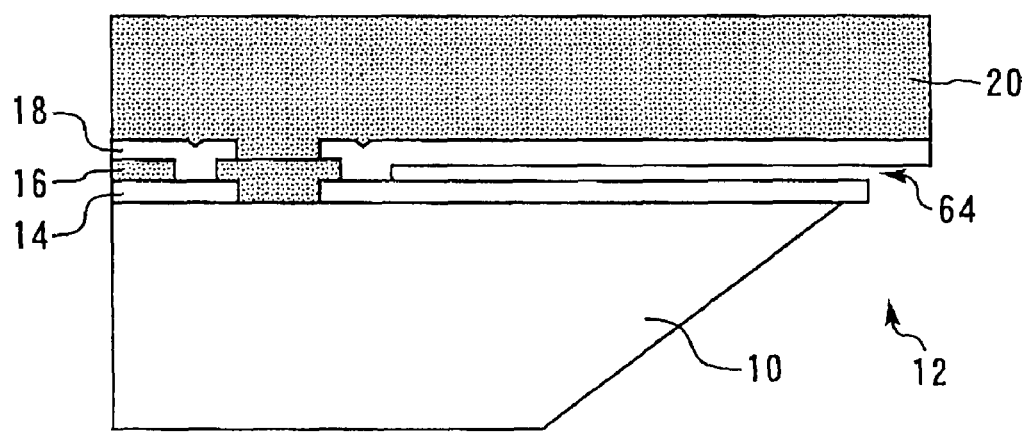
FIG. 40 is a sectional view showing a semiconductor pressure sensor according to the eighth embodiment.

A semiconductor pressure sensor according to the eighth embodiment will be described focusing only aspects different from the first embodiment. FIG. 40 is a sectional view showing a semiconductor pressure sensor according to the eighth embodiment.

By sufficiently securing the length of the sacrifice layer 38 on the silicon substrate 10 (10 μm or more), a gap 64 is formed between the silicon substrate 10 and the doped polysilicon film 20 in the vicinity of the outside of the through-hole 12. Therefore, when a pressure is applied onto the diaphragm 24 and the diaphragm 24 is displaced downward, the silicon substrate 10 becomes a stopper. Thereby, even if an excessive pressure is applied onto the diaphragm 24, the damage of the diaphragm 24 can be prevented.

Figure 41:
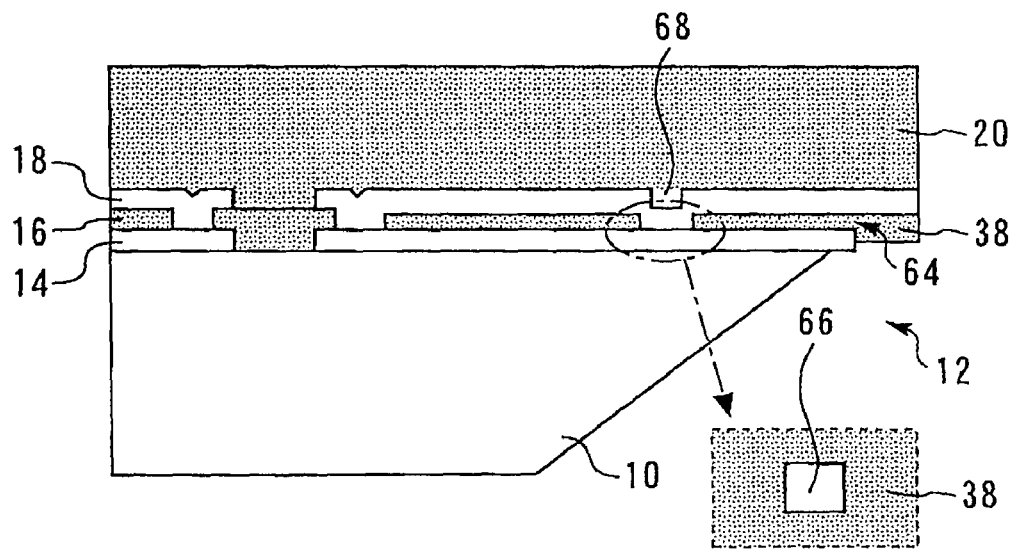
FIG. 41 is a sectional view showing a modified example of the semiconductor pressure sensor according to the eighth embodiment.

FIG. 41 is a sectional view showing a modified example of the semiconductor pressure sensor according to the eighth embodiment. By forming an opening 66 in the sacrifice layer 38, a convex portion 68 (dimple) is formed on the lower surface of the polysilicon film 20 in the gap 64. Thereby, the adhesion of the diaphragm 24 to the silicon substrate 10 can be prevented.

Ninth Embodiment

A method for manufacturing a semiconductor pressure sensor according to the ninth embodiment will be described focusing only aspects different from the first embodiment.

Figure 42:
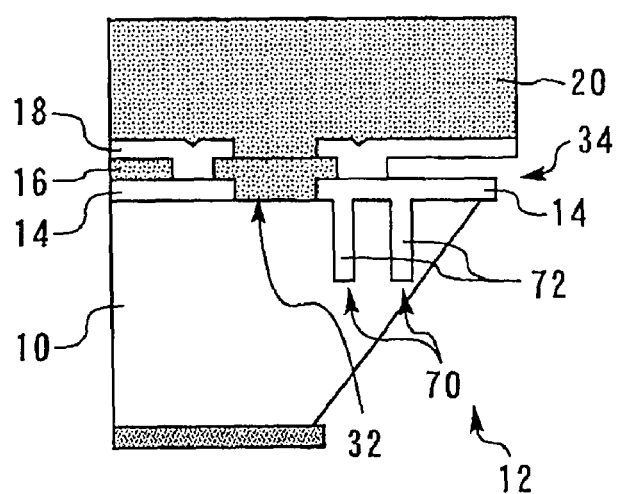
FIG. 42 is a sectional view for explaining a method for manufacturing a semiconductor pressure sensor according to the ninth embodiment.

As shown in FIG. 42, channels 70 are formed in the silicon substrate 10 in the region between the opening 32 and the opening 34. Then, the insulating film 14 is buried in the channels 70 to form side-etching preventing layers 72.

The side-etching preventing layers 72 prevent side-etching when the sacrifice layer 38 is removed after forming the through-hole 12. Thereby, even if the length of the insulating film 14 inside the anchor 40 cannot be sufficiently taken, the sacrifice layer 38 can be completely removed by etching having sufficient latitude. Therefore, the semiconductor pressure sensor can be easily manufactured.

In addition, when 10 μm of the length of the insulating film 14 inside the anchor 40 is taken, and 25% by weight of TMAH is used at 90° C., the time taken for the silicon substrate 10 to be subjected to side-etching and reach the anchor 40 after completely removing the sacrifice layer 38 is about 120 minutes. Within this time, if the formation of the entire diaphragm 24 is completed considering the variation of wafer thickness in the wafer surface or between batches and the etching rate of silicon, no side-etching preventing layers 72 are required.

Tenth Embodiment

A method for manufacturing a semiconductor pressure sensor according to the tenth embodiment will be described focusing only aspects different from the first embodiment.

Figure 43:
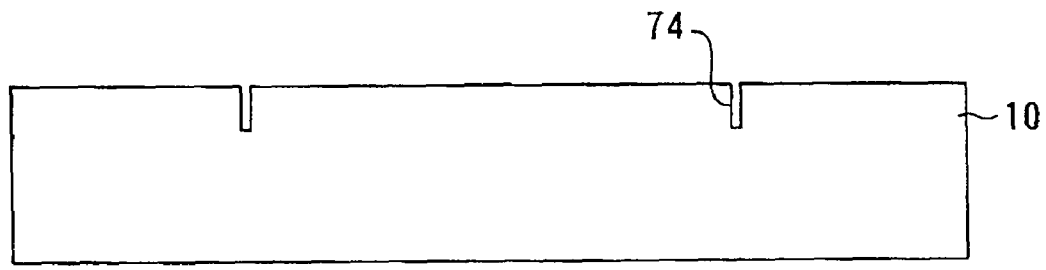
FIGS. 43 to 48 are sectional views for explaining a method for manufacturing a semiconductor pressure sensor according to the tenth embodiment.

First, as shown in FIG. 43, a channel 74 is formed on the upper surface of the silicon substrate 10 so as to surround the central portion of the silicon substrate 10 of the crystal orientation (100).

Figure 44:
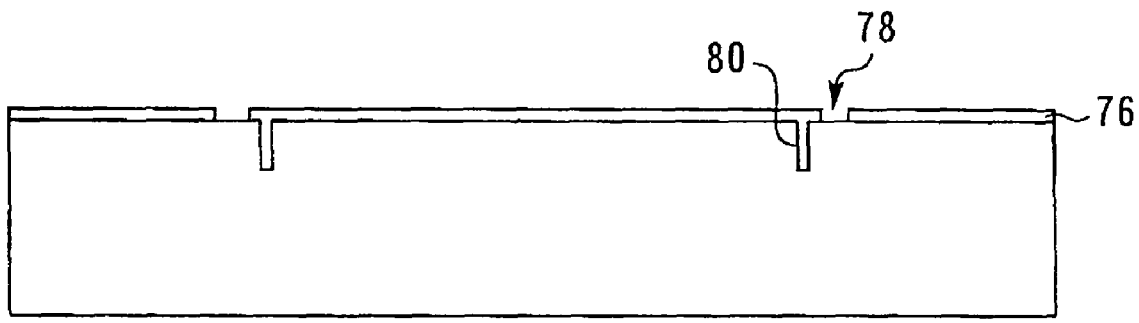

Next, as shown in FIG. 44, an insulating film 76 such as a thermal oxide film is formed on the silicon substrate 10 so as to bury the channel 74, and an opening 78 is formed in the insulating film 76 on the outside of the channel 74. The insulating film 76 buried in the channel 74 becomes a side-etching preventing layer 80.

Figure 45:
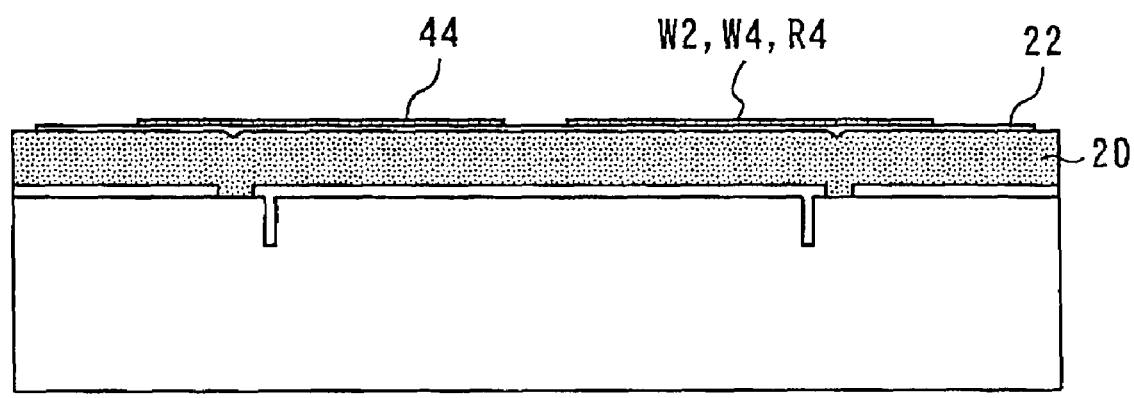

Next, as shown in FIG. 45, a doped polysilicon film 20 is formed on the silicon substrate 10 and the insulating film 76 to fill the opening 78. On the doped polysilicon film 20, an insulating film 22, such as an HTO film, is formed by CVD. Here, the doped polysilicon film 20 buried in the opening 78 becomes an anchor 82.

On the insulating film 22, polysilicon gauge resistances R1, R2, R3, and R4 and polysilicon wirings W1, W2, W3, and W4 are formed in the same manner as in the first embodiment.

Figure 46:
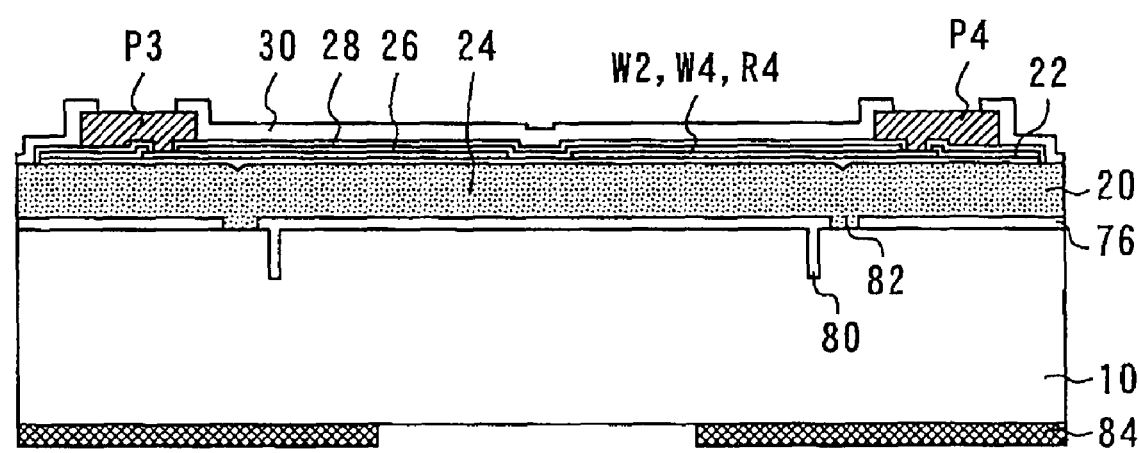

Next, as shown in FIG. 46, an impurity is implanted into the polysilicon gauge resistances R1, R2, R3, and R4 and the polysilicon wirings W1, W2, W3, and W4 in the same manner as in the first embodiment to form an insulating film 26, a nitride film 28, aluminum pads P1, P2, P3, and P4, and a glass coating 30.

Also, the silicon substrate 10 is thinned to about 200 μm, and a mask 84, such as a positive resist, is formed on the lower surface of the silicon substrate 10. The mask 84 is formed considering the superimposing misalignment of photoengraving and the quantity of side-etching.

Figure 47:
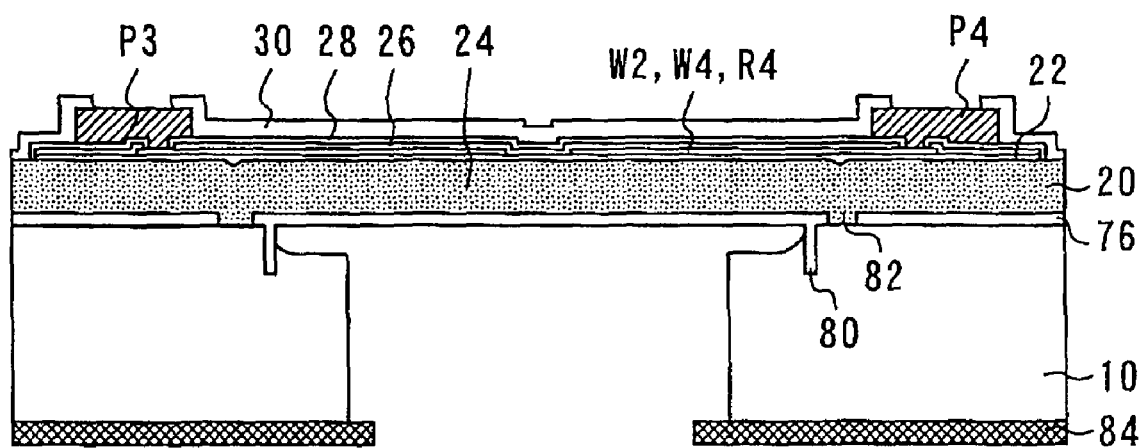

Next, as shown in FIG. 47, the central portion of the silicon substrate 10 is subjected to ICP (Inductively Coupled Plasma) dry etching from the lower surface side using the insulating film 76 as an etching stopper to form a through-hole 12.

When ICP dry etching is continuously performed after forming the through-hole 12, a notch is generated. Thereby, the silicon substrate 10 is side-etched to the side-etching preventing layer 80 formed inside the anchor 82.

Figure 48:
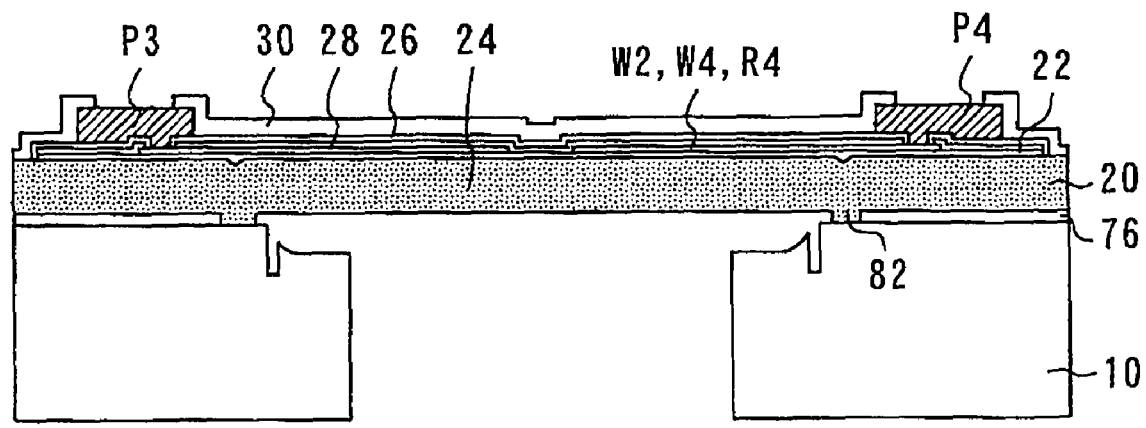

Next, as shown in FIG. 48, the insulating film 76 disposed inside the opening 78 and the insulating film 76 buried in the channel 74 are etched off selectively to the doped polysilicon film 20 by HF treatment. Thereafter, the mask 84 is removed. By the above-described processes the semiconductor pressure sensor according to the tenth embodiment is manufactured.

As described above, dry etching is used as the etching for forming the through-hole 12, unlike in the first embodiment. Thereby, since the through-hole 12 can be vertically processed, further size reduction is feasible. Also, by burying the insulating film 76 in the channel 74 to form the side-etching preventing layer 80, the wide spreading of the notch can be suppressed.

Obviously many modifications and variations of the present invention are possible in the light of the above teachings. It is therefore to be understood that within the scope of the appended claims the invention may be practiced otherwise than as specifically described.

The entire disclosure of a Japanese Patent Application No. 2009-282468, filed on Dec. 14, 2009 including specification, claims, drawings and summary, on which the Convention priority of the present application is based, are incorporated herein by reference in its entirety.

What is claimed is:

1. A semiconductor pressure sensor comprising:
a substrate having a through-hole;
a polysilicon film provided on the substrate and having a diaphragm above the through-hole;
an insulating film provided on the polysilicon film;
first, second, third, and forth polysilicon gauge resistances provided on the insulating film and having a piezoresistor effect; and
polysilicon wirings connecting the first, second, third, and forth polysilicon gauge resistances in a bridge shape,
wherein each of the first and second polysilicon gauge resistances is disposed on a central portion of the diaphragm and has a plurality of resistors connected in parallel,
a structure of the first polysilicon gauge resistance is same as a structure of the second polysilicon gauge resistance, and
a direction of the first polysilicon gauge resistance is same as a direction of the second polysilicon gauge resistance.

2. The semiconductor pressure sensor according to claim 1, wherein the first, second, third, and forth polysilicon gauge resistances are thinner than the polysilicon wirings.

3. The semiconductor pressure sensor according to claim 1, wherein impurity concentration of the first, second, third, and forth polysilicon gauge resistances is lower than impurity concentration of the polysilicon wirings.

4. The semiconductor pressure sensor according to claim 1, wherein the insulating film has a plurality of convex portions, and the first, second, third, and forth polysilicon gauge resistances are side walls provided on side surfaces of the plurality of convex portions.

5. The semiconductor pressure sensor according to claim 1, wherein the insulating film has a plurality of concave portions, and the first, second, third, and forth polysilicon gauge resistances are buried in the plurality of concave portions.

6. The semiconductor pressure sensor according to claim 1, wherein the third and fourth polysilicon gauge resistances are disposed on peripheral portion of the diaphragm,
structures of the third and fourth polysilicon gauge resistances are same as the structures of the first and second polysilicon gauge resistances, and
directions of the third and fourth polysilicon gauge resistances are same as the directions of the first and second polysilicon gauge resistances.

7. The semiconductor pressure sensor according to claim 1, wherein the third and fourth polysilicon gauge resistances are disposed outside the diaphragm.

8. The semiconductor pressure sensor according to claim 1, further comprising pads provided on the insulating film and connected to the polysilicon wirings,
wherein the polysilicon film in a region wherein the pads are disposed is separated from the polysilicon film in a region wherein the diaphragm is formed by a separating channel.

9. The semiconductor pressure sensor according to claim 1, wherein a gap is provided between the substrate and the polysilicon film in vicinity of an outside of the through-hole,
a convex portion is provided on a lower surface of the polysilicon film in the gap.

* * * * *